(12) United States Patent
Blanchard, III et al.

(10) Patent No.: US 8,145,516 B2
(45) Date of Patent: Mar. 27, 2012

(54) CROSS-VIRTUAL-WORLD RESOURCE SCHEDULING FRAMEWORK

(75) Inventors: John A. Blanchard, III, Algonquin, IL (US); Jennifer Martin, Chicago, IL (US)

(73) Assignee: International Business Machines Corporation, Armonk, NY (US)

( * ) Notice: Subject to any disclaimer, the term of this patent is extended or adjusted under 35 U.S.C. 154(b) by 1291 days.

(21) Appl. No.: 11/777,325

(22) Filed: Jul. 13, 2007

(65) Prior Publication Data

US 2009/0017916 A1 Jan. 15, 2009

(51) Int. Cl.
G06Q 10/00 (2012.01)
G06F 3/048 (2006.01)
G06F 15/16 (2006.01)

(52) U.S. Cl. .......... 705/7.12; 715/757; 709/204

(58) Field of Classification Search .......... 715/757, 715/758, 759, 753, 754, 755, 756, 751, 700, 715/848, 849, 850; 348/14.08, 14.1, 14.03, 348/E7.083; 709/204
See application file for complete search history.

(56) References Cited

U.S. PATENT DOCUMENTS

| | | | | |
|---|---|---|---|---|
| 7,036,082 B1 * | 4/2006 | Dalrymple et al. | ........... | 715/757 |
| 7,099,745 B2 * | 8/2006 | Ebert | ........... | 700/245 |
| 2002/0007488 A1 * | 1/2002 | Kikinis et al. | ........... | 725/40 |
| 2003/0037109 A1 | 2/2003 | Newman et al. | | |
| 2004/0139155 A1 * | 7/2004 | Miller et al. | ........... | 709/204 |
| 2006/0178968 A1 * | 8/2006 | Jung et al. | ........... | 705/35 |
| 2006/0178970 A1 | 8/2006 | Jung et al. | | |
| 2006/0178975 A1 | 8/2006 | Jung et al. | | |
| 2007/0035549 A1 | 2/2007 | Jung et al. | | |
| 2008/0189619 A1 * | 8/2008 | Reed et al. | ........... | 715/751 |
| 2008/0255957 A1 * | 10/2008 | Erdem et al. | ........... | 705/26 |
| 2008/0262911 A1 * | 10/2008 | Altberg et al. | ........... | 705/14 |

OTHER PUBLICATIONS

Businessgreen, "IBM looks into virtual reality to connect staff", downloaded from http://www.infomaticsonline.co.uk.articles/print/2166761 on May 17, 2007.

Dawson, F. et al., "Internet Calendaring and Scheduling Core Object Specification (iCalendar)", downloaded from http://www.ietf/prg.rfc2445/txt on Apr. 9, 2007.

Virtual Worlds Management, "Virtual Worlds 2007 Conference" downloaded from http://www.virtualworlds2007.com/ on May 17, 2007.

* cited by examiner

Primary Examiner — Igor Borissov
(74) Attorney, Agent, or Firm — Robert H. Frantz; David A. Mims, Jr.; Mark C. Vallone

(57) ABSTRACT

A cross-world framework for providing integrated scheduling and reservation of virtual resources. Users are allowed to access the scheduling application from a website or an in-world interface. According to one embodiment, the framework uses the iCal industry standard calendaring format, and includes user configurable cross-channel notifications.

20 Claims, 18 Drawing Sheets

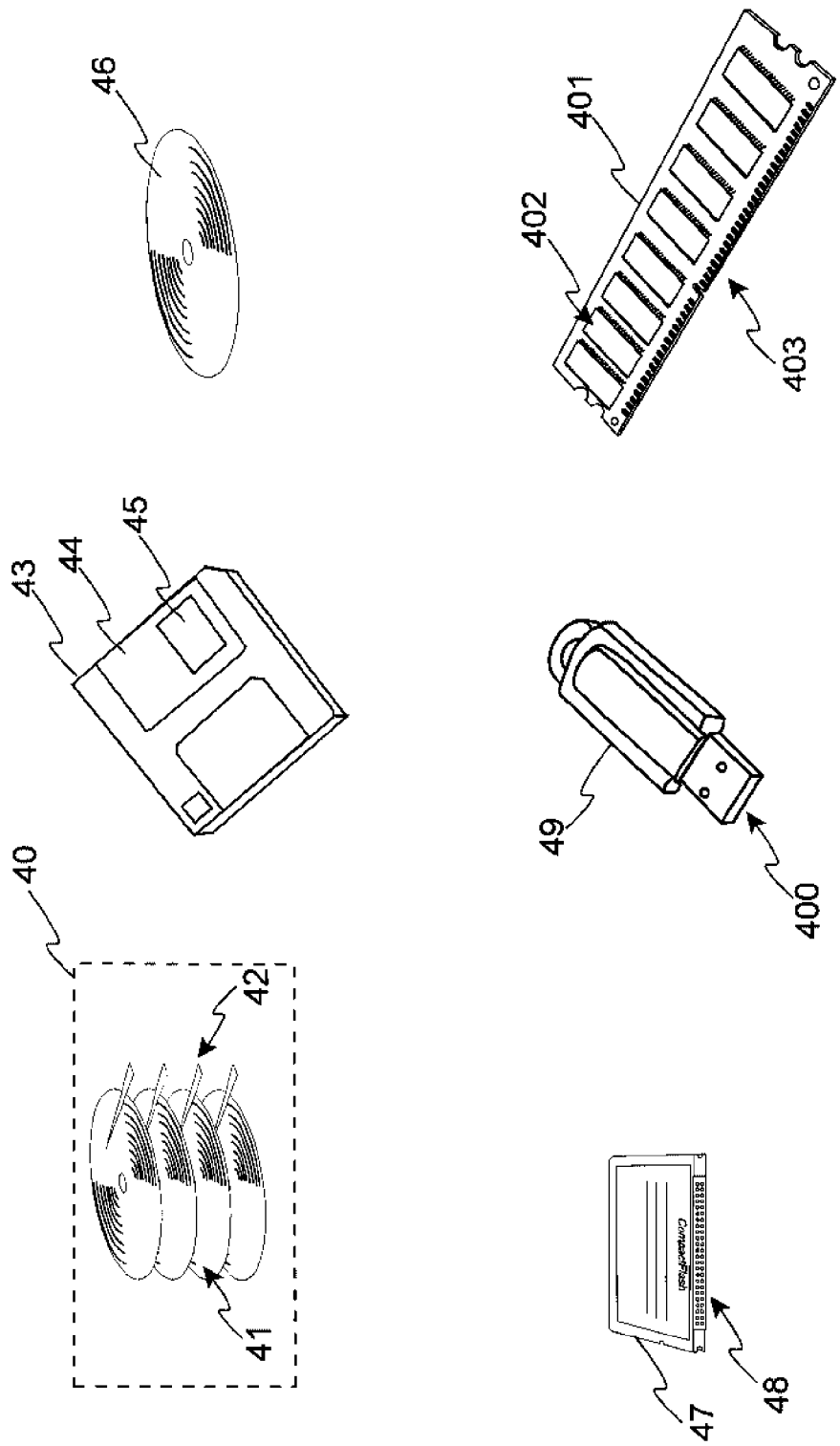

CROSS-VIRTUAL-WORLD RESOURCE SCHEDULING FRAMEWORK

BACKGROUND OF THE INVENTION

1. Field of the Invention

The present invention relates generally to cross-platform scheduling technologies for "Virtual World" systems, Massively Multiplayer Online Role Playing systems, and the like.

2. Background of the Invention

Whereas the determination of a publication, technology, or product as prior art relative to the present invention requires analysis of certain dates and events not disclosed herein, no statements made within this Background of the Invention shall constitute an admission by the Applicants of prior art unless the term "Prior Art" is specifically stated. Otherwise, all statements provided within this Background section are "other information" related to or useful for understanding the invention.

"Virtual Worlds", also sometimes referred to as "Massively Multi-Player Online Role Playing Games" ("MMPorg") systems, are well known in the art for their ability to allow users, or "players", to assume a virtual identity, and to interact through that identity with the system's logic as well as with other users or players through their own virtual identities. Some of the presently available Virtual World systems and products include, but are not limited to, Second Life™, MindArk PE AB's Intropia™, and Makena Technologies' There<dot>com™, where <dot>represents the period or dot character ".".

By configuring the virtual identity, a user is enabled to create a persona of his or her liking, and to interact within the virtual world and the other users, who are also represented by their own virtual avatars and identities. Most Virtual World's allow the user to select or create a three-dimensional representation of his or her virtual identity, referred to as an avatar. Avatars can be realistic in their appearance, or can be a fantasy creature. Other characteristics, such as movement speed and restrictions, communications abilities, and interaction limitations or abilities, can be defined for a user's virtual identity.

While these types of virtual worlds began as gaming and role playing products, they have now evolved into useful platforms for other purposes. One such purpose is an evolution of online meetings, online conferences, and online training or education.

Previous products directed towards these purposes were based on presenting the real voice and/or real image of each "attendee" to an online meeting, either through sharing of still photos of each attendee, or through use of webcams to transmit live images. Communications were enabled through simultaneous use of telephone lines, or through use of voice-over-Internet-Protocol ("VoIP") and/or text messaging.

While these systems offer many advantages, such as saving travel costs, allowing quicker dissemination of information, and fostering near-face-to-face relationships, one draw back of such online meetings is that there is little or no sensation of community during the online conference—each attendee still feels as if he or she is using a computer alone to converse with the other attendees.

With the evolution of Virtual World's into this manner of usage, many of these issues are resolved because there is a greater sense of community or social interaction as the experience is much more complete and realistic. Each attendee feels much more immersed in the meeting virtual environment, including the virtual meeting room or space, and each attendee has a greater sensation of the other attendees' presence because each attendee has a virtual position within the group of attendees, which cannot be had from a standard web meeting.

Further, the facilities issue is alleviated through hosting meetings, training, and conferences in Virtual World's. Rather than renting expensive meeting facilities, and providing expensive real display fixtures and furniture, a company can configure a virtual meeting in a virtual world which has all of the "appearance" factors as desired at a fraction of the costs of a corresponding real-world meeting space. Even better, the virtual meeting space can be reconfigured as needed, such as expanding the space when a larger-than-expected attendee group "signs up" to attend.

Since many original virtual worlds did not restrict where players could "go" within the world, except for restrictions placed on certain levels or privileges for each player, in order to host business-to-business functions, some modifications to the virtual world systems were made.

Chief among these modifications were definitions and controls put in place to allow definition of "private virtual worlds", where one or more users could control which other users could "enter" the private virtual world. This allows a company such as IBM to create multiple private virtual worlds within a virtual world system, such as Second Life, for the purposes of employee training, customer meetings, etc., without the concern for third-parties accessing sensitive or confidential information.

SUMMARY OF THE INVENTION

The present invention comprises a cross-world framework for providing integrated scheduling and reservation of virtual resources. Users are allowed to access the scheduling application from a website or an in-world interface. According to one embodiment, the framework uses the iCal industry standard calendaring format, and includes user configurable cross-channel notifications.

BRIEF DESCRIPTION OF THE DRAWINGS

The following detailed description when taken in conjunction with the figures presented herein provide a complete disclosure of the invention.

FIGS. 4a, 4b and 4c, illustrate computer readable media of various removable and fixed types, signal transceivers, and parallel-to-serial-to-parallel signal circuits.

DETAILED DESCRIPTION OF THE INVENTION

The inventors of the present invention have recognized and solved problems previously unrecognized by others in the art of scheduling resources in multiple virtual world systems.

Suitable Computing Platform

Whereas at least one embodiment of the present invention incorporates, uses, or operates on, with, or through one or more computing platforms, and whereas many devices, even purpose-specific devices, are actually based upon computing platforms of one type or another, it is useful to describe a suitable computing platform, its characteristics, and its capabilities.

Therefore, it is useful to review a generalized architecture of a computing platform which may span the range of implementation, from a high-end web or enterprise server platform, to a personal computer, to a portable PDA or wireless phone.

In one embodiment of the invention, the functionality including the previously described logical processes are performed in part or wholly by software executed by a computer, such as personal computers, web servers, web browsers, or even an appropriately capable portable computing platform, such as personal digital assistant ("PDA"), web-enabled wireless telephone, or other type of personal information management ("PIM") device. In alternate embodiments, some or all of the functionality of the invention are realized in other logical forms, such as circuitry.

Figure 2A:
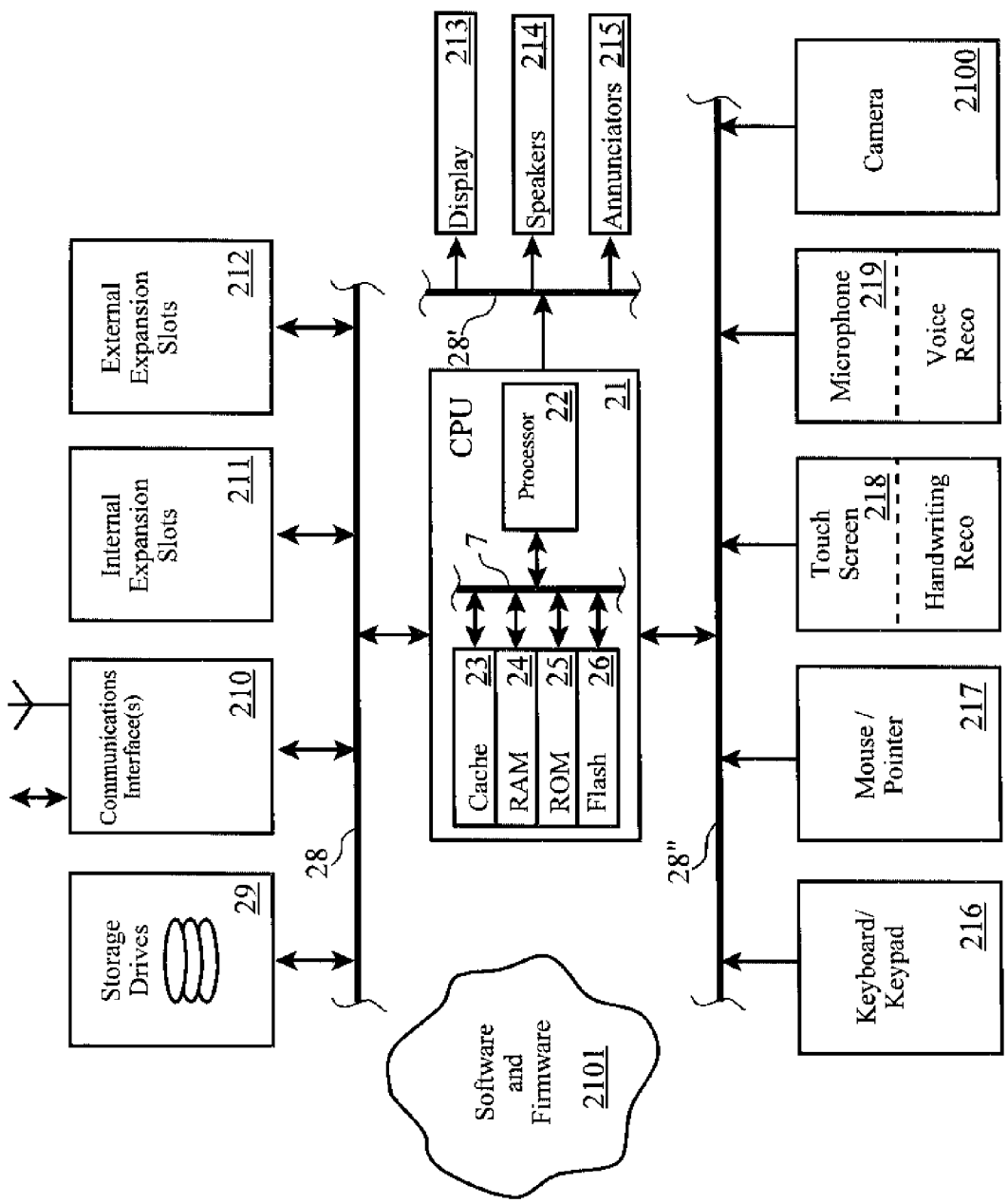
FIGS. 2a and 2b show a generalized computing platform architecture, and a generalized organization of software and firmware of such a computing platform architecture.

Turning to FIG. 2a, a generalized architecture is presented including a central processing unit (21) ("CPU"), which is typically comprised of a microprocessor (22) associated with random access memory ("RAM") (24) and read-only memory ("ROM") (25). Often, the CPU (21) is also provided with cache memory (23) and programmable FlashROM (26). The interface (27) between the microprocessor (22) and the various types of CPU memory is often referred to as a "local bus", but also may be a more generic or industry standard bus.

Many computing platforms are also provided with one or more storage drives (29), such as hard-disk drives ("HDD"), floppy disk drives, compact disc drives (CD, CD-R, CD-RW, DVD, DVD-R, etc.), and proprietary disk and tape drives (e.g., Iomega Zip™ and Jaz™, Addonics SuperDisk™, etc.). Additionally, some storage drives may be accessible over a computer network.

Many computing platforms are provided with one or more communication interfaces (210), according to the function intended of the computing platform. For example, a personal computer is often provided with a high speed serial port (RS-232, RS-422, etc.), an enhanced parallel port ("EPP"), and one or more universal serial bus ("USB") ports. The computing platform may also be provided with a local area network ("LAN") interface, such as an Ethernet card, and other high-speed interfaces such as the High Performance Serial Bus IEEE-1394.

Computing platforms such as wireless telephones and wireless networked PDA's may also be provided with a radio frequency ("RF") interface with antenna, as well. In some cases, the computing platform may be provided with an infrared data arrangement ("IrDA") interface, too.

Computing platforms are often equipped with one or more internal expansion slots (211), such as Industry Standard Architecture ("ISA"), Enhanced Industry Standard Architecture ("EISA"), Peripheral Component Interconnect ("PCI"), or proprietary interface slots for the addition of other hardware, such as sound cards, memory boards, and graphics accelerators.

Additionally, many units, such as laptop computers and PDA's, are provided with one or more external expansion slots (212) allowing the user the ability to easily install and remove hardware expansion devices, such as PCMCIA cards, SmartMedia cards, and various proprietary modules such as removable hard drives, CD drives, and floppy drives.

Often, the storage drives (29), communication interfaces (210), internal expansion slots (211) and external expansion slots (212) are interconnected with the CPU (21) via a standard or industry open bus architecture (28), such as ISA, EISA, or PCI. In many cases, the bus (28) may be of a proprietary design.

A computing platform is usually provided with one or more user input devices, such as a keyboard or a keypad (216), and mouse or pointer device (217), and/or a touch-screen display (218). In the case of a personal computer, a full size keyboard is often provided along with a mouse or pointer device, such as a track ball or TrackPoint™. In the case of a web-enabled wireless telephone, a simple keypad may be provided with one or more function-specific keys. In the case of a PDA, a touch-screen (218) is usually provided, often with handwriting recognition capabilities.

Additionally, a microphone (219), such as the microphone of a web-enabled wireless telephone or the microphone of a personal computer, is supplied with the computing platform. This microphone may be used for simply reporting audio and voice signals, and it may also be used for entering user choices, such as voice navigation of web sites or auto-dialing telephone numbers, using voice recognition capabilities.

Many computing platforms are also equipped with a camera device (2100), such as a still digital camera or full motion video digital camera.

One or more user output devices, such as a display (213), are also provided with most computing platforms. The display (213) may take many forms, including a Cathode Ray Tube ("CRT"), a Thin Flat Transistor ("TFT") array, or a simple set of light emitting diodes ("LED") or liquid crystal display ("LCD") indicators.

One or more speakers (214) and/or annunciators (215) are often associated with computing platforms, too. The speakers (214) may be used to reproduce audio and music, such as the speaker of a wireless telephone or the speakers of a personal computer. Annunciators (215) may take the form of simple beep emitters or buzzers, commonly found on certain devices such as PDAs and PIMs.

These user input and output devices may be directly interconnected (28', 28") to the CPU (21) via a proprietary bus structure and/or interfaces, or they may be interconnected through one or more industry open buses such as ISA, EISA, PCI, etc. The computing platform is also provided with one or more software and firmware (2101) programs to implement the desired functionality of the computing platforms.

Figure 2B:
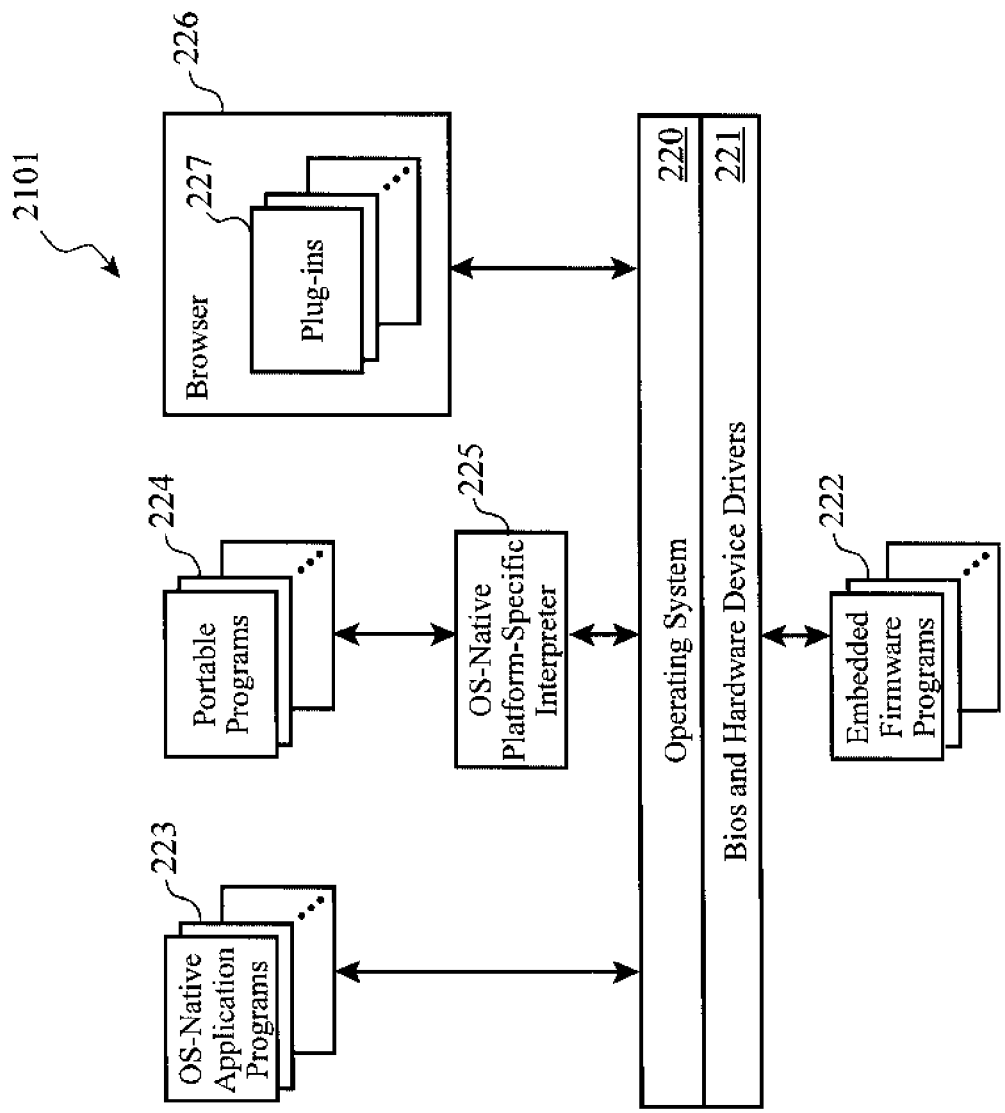

Turning to now FIG. 2*b*, more detail is given of a generalized organization of software and firmware (2101) on this range of computing platforms. One or more operating system ("OS") native application programs (223) may be provided on the computing platform, such as word processors, spreadsheets, contact management utilities, address book, calendar, email client, presentation, financial and bookkeeping programs.

Additionally, one or more "portable" or device-independent programs (224) may be provided, which must be interpreted by an OS-native platform-specific interpreter (225), such as Java™ scripts and programs.

Often, computing platforms are also provided with a form of web browser or micro-browser (226), which may also include one or more extensions to the browser such as browser plug-ins (227).

The computing device is often provided with an operating system (220), such as Microsoft Windows™, UNIX, IBM OS/2™, IBM AIX™, open source LINUX, Apple's MAC OS™, or other platform specific operating systems. Smaller devices such as PDA's and wireless telephones may be equipped with other forms of operating systems such as real-time operating systems ("RTOS") or Palm Computing's PalmOS™.

A set of basic input and output functions ("BIOS") and hardware device drivers (221) are often provided to allow the operating system (220) and programs to interface to and control the specific hardware functions provided with the computing platform.

Additionally, one or more embedded firmware programs (222) are commonly provided with many computing platforms, which are executed by onboard or "embedded" microprocessors as part of the peripheral device, such as a micro controller or a hard drive, a communication processor, network interface card, or sound or graphics card.

As such, FIGS. 2*a* and 2*b* describe in a general sense the various hardware components, software and firmware programs of a wide variety of computing platforms, including but not limited to personal computers, PDAs, PIMs, web-enabled telephones, and other appliances such as WebTV™ units. As such, we now turn our attention to disclosure of the present invention relative to the processes and methods preferably implemented as software and firmware on such a computing platform. It will be readily recognized by those skilled in the art that the following methods and processes may be alternatively realized as hardware functions, in part or in whole, without departing from the spirit and scope of the invention.

Computer-Readable Media Embodiments

In another embodiment of the invention, logical processes according to the invention and described herein are encoded on or in one or more computer-readable media. Some computer-readable media are read-only (e.g. they must be initially programmed using a different device than that which is ultimately used to read the data from the media), some are write-only (e.g. from the data encoders perspective they can only be encoded, but not read simultaneously), or read-write. Still some other media are write-once, read-many-times.

Some media are relatively fixed in their mounting mechanisms, while others are removable, or even transmittable. All computer-readable media form two types of systems when encoded with data and/or computer software: (a) when removed from a drive or reading mechanism, they are memory devices which generate useful data-driven outputs when stimulated with appropriate electromagnetic, electronic, and/or optical signals; and (b) when installed in a drive or reading device, they form a data repository system accessible by a computer.

FIG. 4*a* illustrates some computer readable media including a computer hard drive (40) having one or more magnetically encoded platters or disks (41), which may be read, written, or both, by one or more heads (42). Such hard drives are typically semi-permanently mounted into a complete drive unit, which may then be integrated into a configurable computer system such as a Personal Computer, Server Computer, or the like.

Similarly, another form of computer readable media is a flexible, removable "floppy disk" (43), which is inserted into a drive which houses an access head. The floppy disk typically includes a flexible, magnetically encodable disk which is accessible by the drive head through a window (45) in a sliding cover (44).

A Compact Disk ("CD") (46) is usually a plastic disk which is encoded using an optical and/or magneto-optical process, and then is read using generally an optical process. Some CD's are read-only ("CD-ROM"), and are mass produced prior to distribution and use by reading-types of drives. Other CD's are writable (e.g. "CD-RW", "CD-R"), either once or many time. Digital Versatile Disks ("DVD") are advanced versions of CD's which often include double-sided encoding of data, and even multiple layer encoding of data. Like a floppy disk, a CD or DVD is a removable media.

Another common type of removable media are several types of removable circuit-based (e.g. solid state) memory devices, such as Compact Flash ("CF") (47), Secure Data ("SD"), Sony's MemoryStick, Universal Serial Bus ("USB") FlashDrives and "Thumbdrives" (49), and others. These devices are typically plastic housings which incorporate a digital memory chip, such as a battery-backed random access chip ("RAM"), or a Flash Read-Only Memory ("FlashROM"). Available to the external portion of the media is one or more electronic connectors (48, 400) for engaging a connector, such as a CF drive slot or a USB slot. Devices such as a USB FlashDrive are accessed using a serial data methodology, where other devices such as the CF are accessed using a parallel methodology. These devices often offer faster access times than disk-based media, as well as increased reliability and decreased susceptibility to mechanical shock and vibration. Often, they provide less storage capability than comparably priced disk-based media.

Yet another type of computer readable media device is a memory module (403), often referred to as a SIMM or DIMM. Similar to the CF, SD, and FlashDrives, these modules incorporate one or more memory devices (402), such as Dynamic RAM ("DRAM"), mounted on a circuit board (401) having one or more electronic connectors for engaging and interfacing to another circuit, such as a Personal Computer motherboard. These types of memory modules are not usually encased in an outer housing, as they are intended for installation by trained technicians, and are generally protected by a larger outer housing such as a Personal Computer chassis.

Figure 4B:
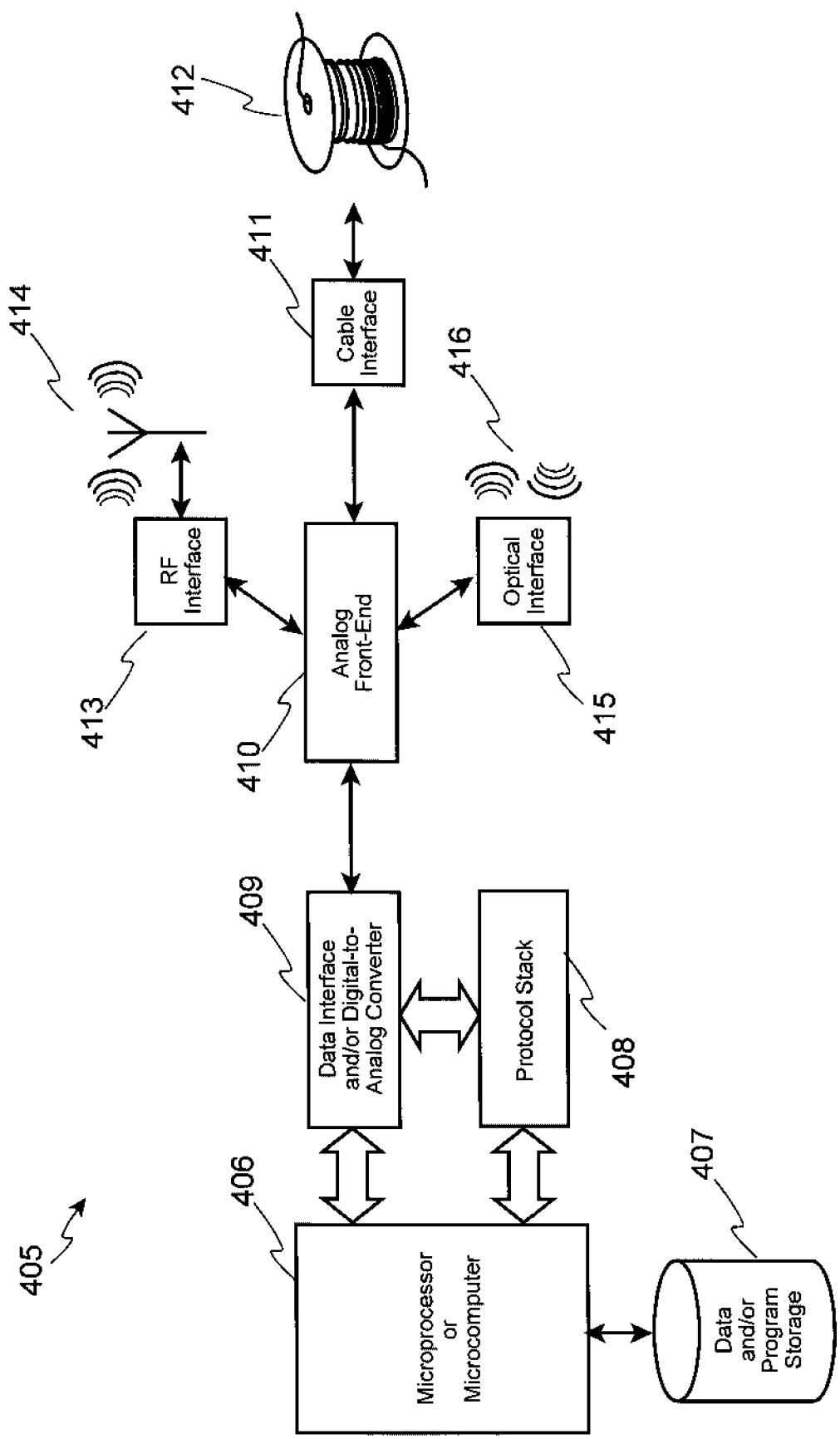

Turning now to FIG. 4*b*, another embodiment option (405) of the present invention is shown in which a computer-readable signal is encoded with software, data, or both, which implement logical processes according to the invention. FIG. 4*b* is generalized to represent the functionality of wireless, wired, electro-optical, and optical signaling systems. For example, the system shown in FIG. 4*b* can be realized in a manner suitable for wireless transmission over Radio Frequencies ("RF"), as well as over optical signals, such as InfraRed Data Arrangement ("IrDA"). The system of FIG. 4*b* may also be realized in another manner to serve as a data transmitter, data receiver, or data transceiver for a USB system, such as a drive to read the aforementioned USB FlashDrive, or to access the serially-stored data on a disk, such as a CD or hard drive platter.

In general, a microprocessor or microcontroller (406) reads, writes, or both, data to/from storage for data, program, or both (407). A data interface (409), optionally including a digital-to-analog converter, cooperates with an optional protocol stack (408), to send, receive, or transceive data between the system front-end (410) and the microprocessor (406). The protocol stack is adapted to the signal type being sent, received, or transceived. For example, in a Local Area Network ("LAN") embodiment, the protocol stack may implement Transmission Control Protocol/Internet Protocol ("TCP/IP"). In a computer-to-computer or computer-to-peripheral embodiment, the protocol stack may implement all or portions of USB, "FireWire", RS-232, Point-to-Point Protocol ("PPP"), etc.

The system's front-end, or analog front-end, is adapted to the signal type being modulated, demodulate, or transcoded. For example, in an RF-based (413) system, the analog front-end comprises various local oscillators, modulators, demodulators, etc., which implement signaling formats such as Frequency Modulation ("FM"), Amplitude Modulation ("AM"), Phase Modulation ("PM"), Pulse Code Modulation ("PCM"), etc. Such an RF-based embodiment typically includes an antenna (414) for transmitting, receiving, or transceiving electromagnetic signals via open air, water, earth, or via RF wave guides and coaxial cable. Some common open air transmission standards are BlueTooth, Global Services for Mobile Communications ("GSM"), Time Division Multiple Access ("TDMA"), Advanced Mobile Phone Service ("AMPS"), and Wireless Fidelity ("Wi-Fi").

In another example embodiment, the analog front-end may be adapted to sending, receiving, or transceiving signals via an optical interface (415), such as laser-based optical interfaces (e.g. Wavelength Division Multiplexed, SONET, etc.), or Infra Red Data Arrangement ("IrDA") interfaces (416). Similarly, the analog front-end may be adapted to sending, receiving, or transceiving signals via cable (412) using a cable interface, which also includes embodiments such as USB, Ethernet, LAN, twisted-pair, coax, Plain-old Telephone Service ("POTS"), etc.

Signals transmitted, received, or transceived, as well as data encoded on disks or in memory devices, may be encoded to protect it from unauthorized decoding and use. Other types of encoding may be employed to allow for error detection, and in some cases, correction, such as by addition of parity bits or Cyclic Redundancy Codes ("CRC"). Still other types of encoding may be employed to allow directing or "routing" of data to the correct destination, such as packet and frame-based protocols.

Figure 4C:
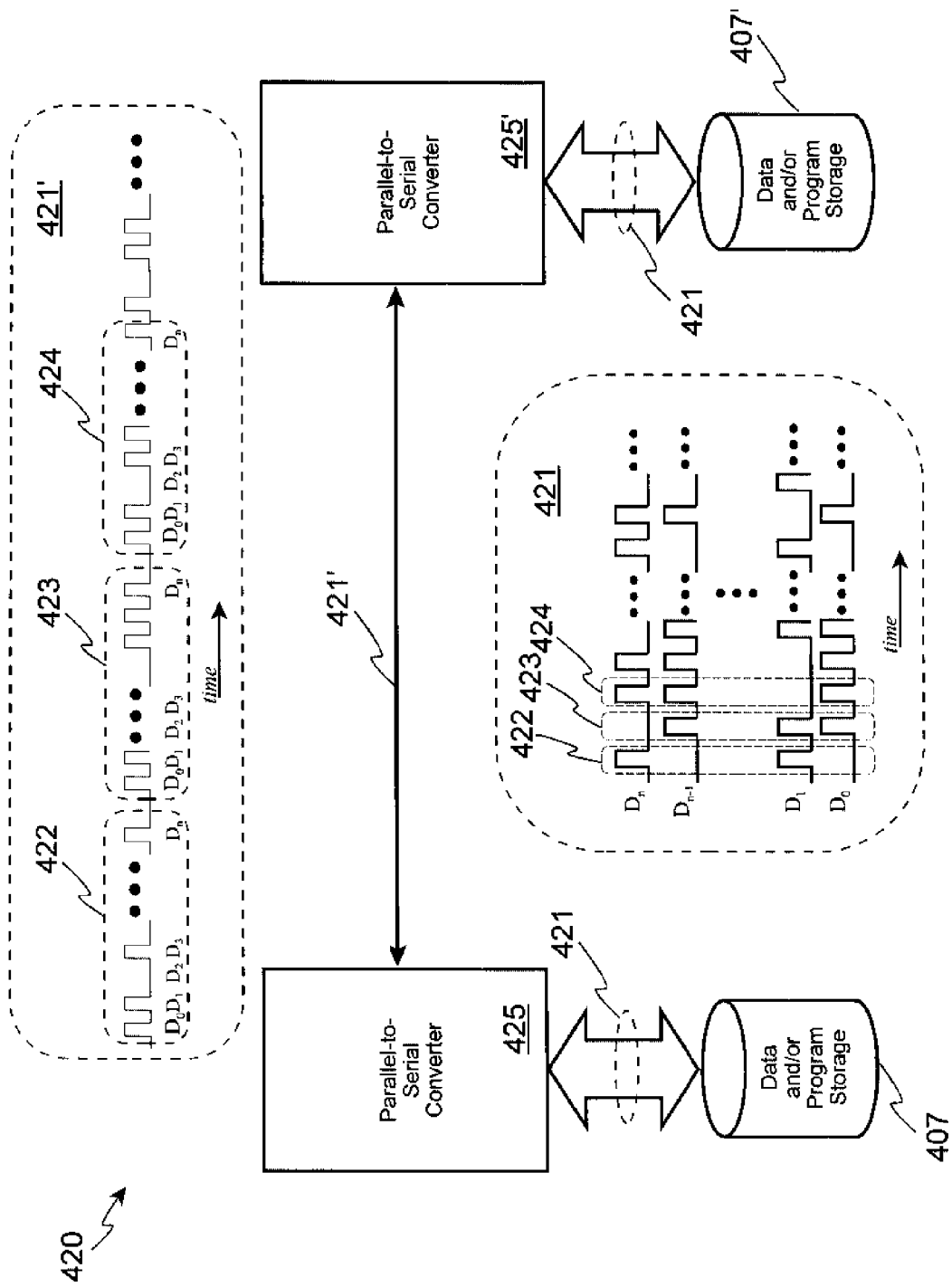

FIG. 4c illustrates conversion systems which convert parallel data to and from serial data. Parallel data is most often directly usable by microprocessors, often formatted in 8-bit wide bytes, 16-bit wide words, 32-bit wide double words, etc. Parallel data can represent executable or interpretable software, or it may represent data values, for use by a computer. Data is often serialized in order to transmit it over a media, such as a RF or optical channel, or to record it onto a media, such as a disk. As such, many computer-readable media systems include circuits, software, or both, to perform data serialization and re-parallelization.

Parallel data (421) can be represented as the flow of data signals aligned in time, such that parallel data unit (byte, word, d-word, etc.) (422, 423, 424) is transmitted with each bit $D_0$-$D_n$ being on a bus or signal carrier simultaneously, where the "width" of the data unit is n−1. In some systems, Do is used to represent the least significant bit ("LSB"), and in other systems, it represents the most significant bit ("MSB"). Data is serialized (421) by sending one bit at a time, such that each data unit (422, 423, 424) is sent in serial fashion, one after another, typically according to a protocol.

As such, the parallel data stored in computer memory (407, 407') is often accessed by a microprocessor or Parallel-to-Serial Converter (425, 425') via a parallel bus (421), and exchanged (e.g. transmitted, received, or transceived) via a serial bus (421'). Received serial data is converted back into parallel data before storing it in computer memory, usually. The serial bus (421') generalized in FIG. 4c may be a wired bus, such as USB or Firewire, or a wireless communications medium, such as an RF or optical channel, as previously discussed.

In these manners, various embodiments of the invention may be realized by encoding software, data, or both, according to the logical processes of the invention, into one or more computer-readable mediums, thereby yielding a product of manufacture and a system which, when properly read, received, or decoded, yields useful programming instructions, data, or both, including, but not limited to, the computer-readable media types described in the foregoing paragraphs.

General Arrangements of Virtual Worlds

Figure 5:
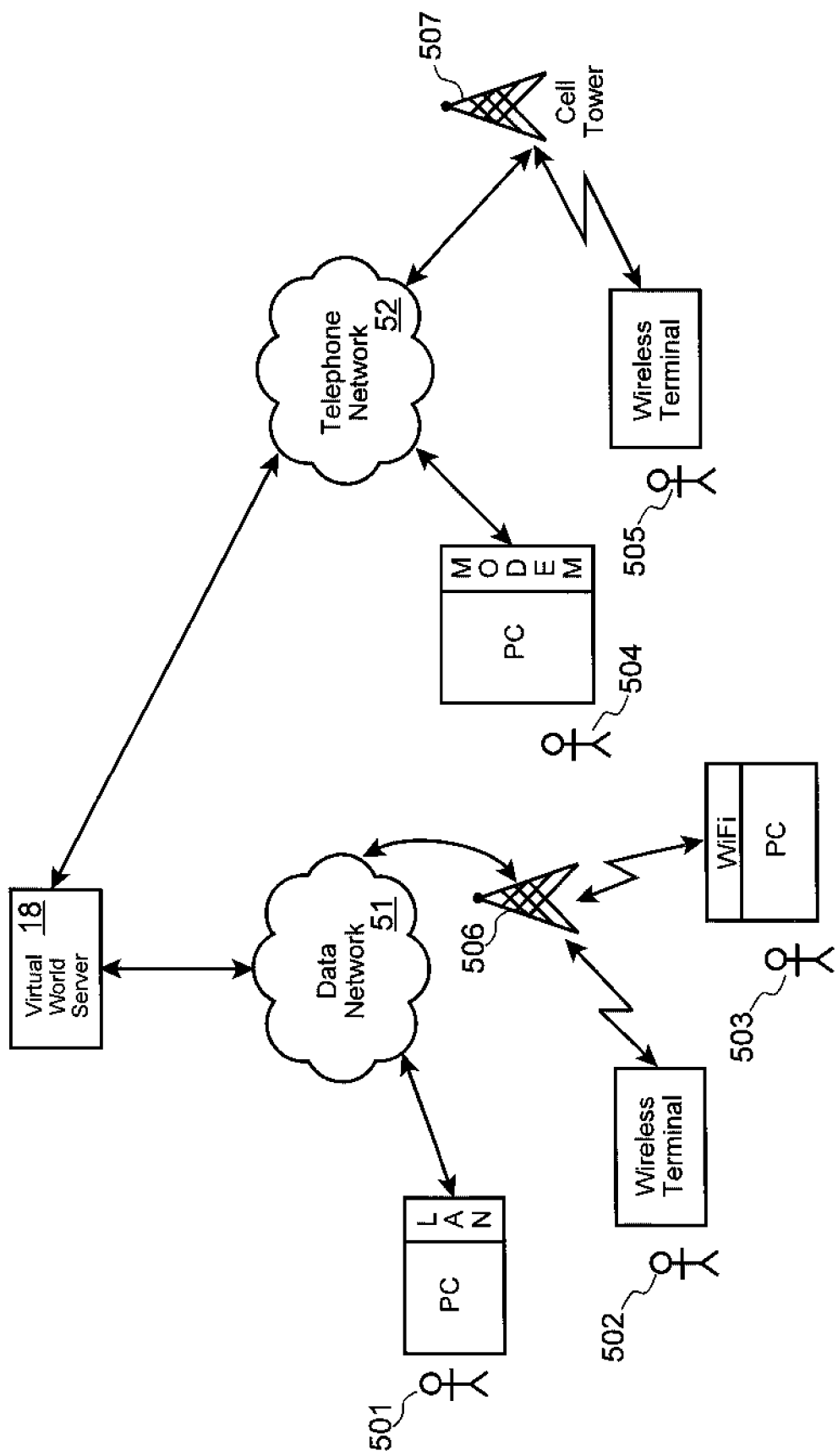
FIG. 5 illustrates arrangements of systems and networks used in order to interact with a virtual world server.

Turning to FIG. 5, a general arrangement of components, networks, and users of a virtual world is shown. A virtual world server (18) is interconnected through a data network (51), such as the Internet or an intranet, or a telephone network (52), such as a public switched telephone network ("PSTN") or a digital telephone network (e.g. digital cellular, Integrated Services Digital Network, Digital Subscriber Line, etc.). Many virtual world server's are interconnected to a combination or data and telephone networks, whereas the convergence of the two types of networks have rendered some networks difficult to clearly distinguish as exclusively data or telephone. For example, Voice over Internet ("VoIP") protocol has allowed telephone calls to be carried by traditionally data-only networks. And, Modulate-Demodulate ("modem") devices have long since allowed data communications over telephone lines. Further, traditionally content oriented networks, such as cable television networks, have also been adapted to carry digitized telephone calls and data connections to the Internet.

Of particular popularity in recent years are various types of wireless networks, from cellular telephone networks, to shorter range networks, such as "WiFi" and Blue Tooth networks, some of which use "towers" (507) and others of which use wireless access points (506) to interconnect a wireless device to a wired network.

In the arrangement of FIG. 5, users (501-505) access the Virtual World server (18) though the various networks (51, 52) using terminal devices such as a personal computer ("PC") with a local area network ("LAN") interface, a wireless terminal such as a cellular telephone or "WiFi" equipped laptop PC, or even a PC with a telephone or cable modem.

Major Functions of a Virtual World Server

Figure 6:
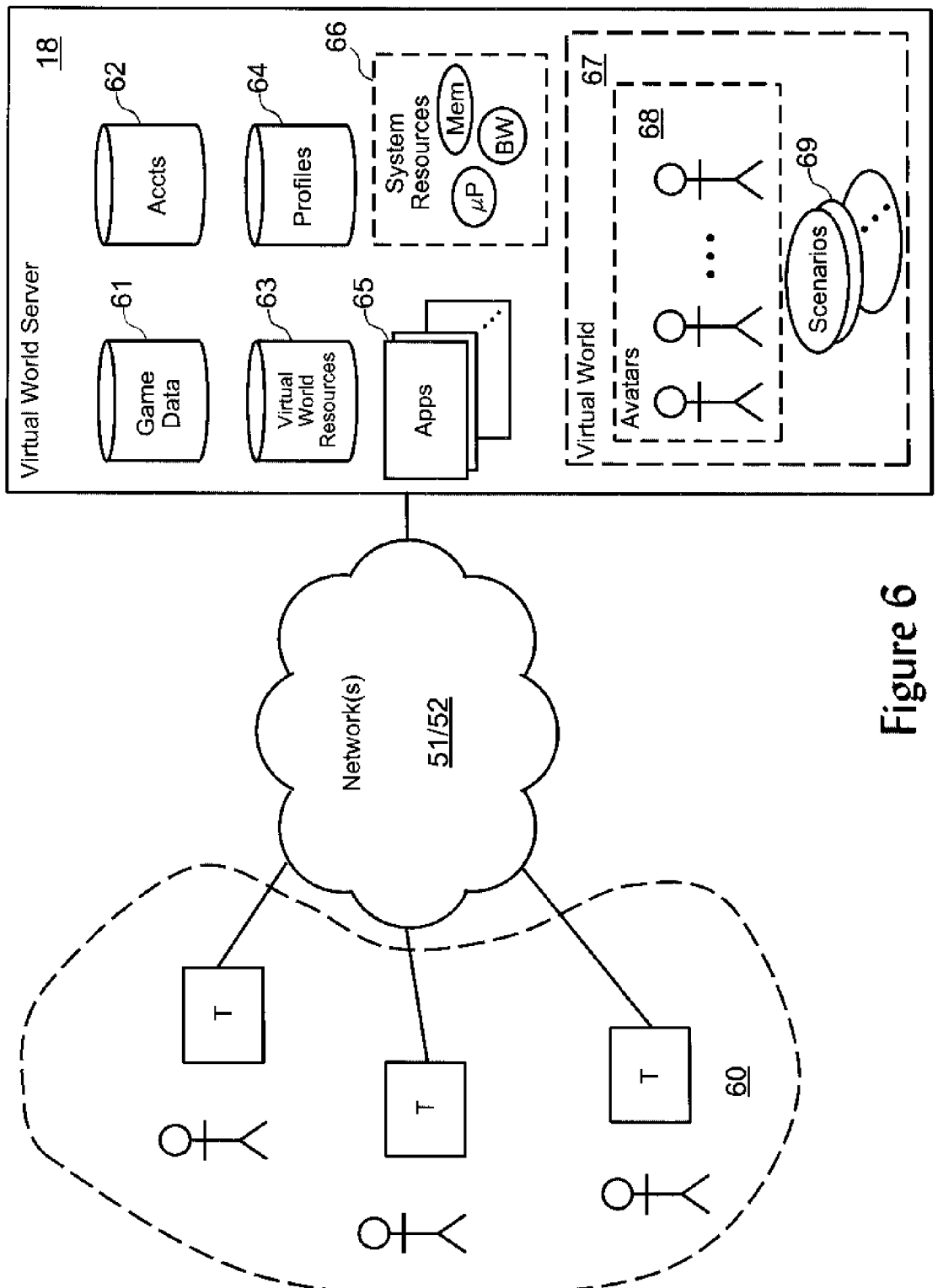
FIG. 6 provides additional information regarding primary components or functional sub-systems of a virtual world server.

FIG. 6 shows some of the major or primary functions of a Virtual World server (18) which is interconnected to one or more user's via their terminals (60) through one or more networks (51, 52). This depiction is a generalization of a virtual world environment, whereas specific virtual world platforms are, to date, typically proprietary in nature. As such, FIG. 6 is presented for reference only, and for the ease of understanding the present invention. It is within the skill of those in the art to adapt, configure, and implement the invention, as described herein, within a specific, proprietary virtual world environment.

Within the Virtual World server (18), there are a number of application programs (65) running, which utilize or game data (61), Virtual World resources (63), user account information (62) and profile (64). Such application programs, and extensions thereto, are often provided or developed in programming languages such as C or Python.

The Virtual World server (18) has integrated into it one or more microprocessors, memory devices and sub-systems, and communications bandwidth or capabilities (66).

Most virtual world servers can maintain and operate more than one "virtual worlds" simultaneously (67). In each of the virtual world's scenarios or sub-worlds (69), user's can use a different or the same avatars (68) to represent themselves.

Underlying Mechanisms of Interaction

Figure 7:
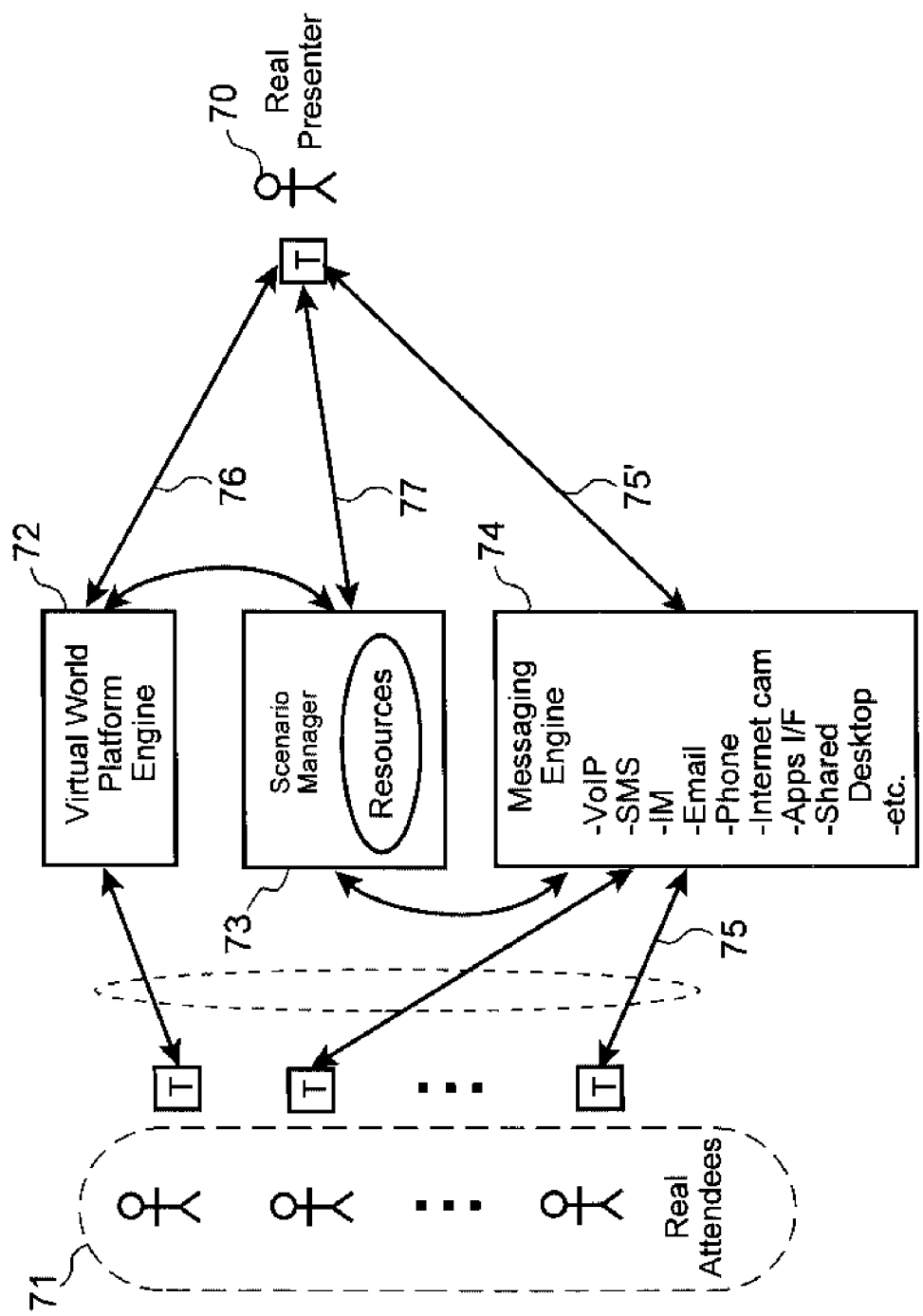
FIG. 7 depicts interactions between various types of users and major functional portions of a virtual world server.

FIG. 7 illustrates a generalized arrangement of a virtual world system which allows the users to interact with each other and with the scenarios created by and maintained by the Virtual World server. This depiction is a generalization of a virtual world interaction scheme, whereas specific virtual world platforms are, to date, typically proprietary in nature. As such, FIG. 7 is presented for reference only, and for the ease of understanding the present invention. It is within the skill of those in the art to adapt, configure, and implement the invention, as described herein, within a specific, proprietary virtual world environment.

In many scenarios, the users are divided into two or more classes of user, such as a presenter (70) and attendees (71). Each class of user may have greater or fewer capabilities within the world, such as a presenter being allowed to share a desktop presentation file with the attendees, but the attendees not being able to share their own desktop applications with other attendees.

In such an arrangement, the primary method of interaction between users and the applications of the Virtual World server is through a variety of messaging capabilities (34), such as VoIP, text messaging ("SMS"), instant messaging (e.g. America Online's Instant Messenger or Lotus' SameTime), electronic mail, telephone audio, internet camera audio/video, application programming interfaces ("API"), shared desktop technologies, and the like.

For example, during a Virtual World conference or presentation, the real presenter (70) may communicate (75, 75') with the real attendees (71) via their virtual presences (e.g. avatars) of the virtual scenario. Further, the real presenter (70) may also communicate (77) with a scenario manager portion (73) of the Virtual World server to accomplish such functions as reserving resources necessary to create and maintain the virtual scenario, freezing the scenario, and controlling attendance to the scenario. The real presenter may also communicate (76) with portions of the Virtual World "engine" (72) to accomplish other administrative functions, as may be necessary.

Illustrative Virtual Scenario

Many virtual worlds provide a three-dimensional visual simulation of each sub-world or scenario, accompanied by appropriate text and/or audio, in order to provide a believable, but not necessarily "realistic", rendering of the scenario to the users. For example, in "fantasy" scenarios, avatars of users may be animals, hypothetical creatures, etc., and the landscape of the scenario may be another plant or a future civilization.

However, in many business-to-business scenarios, such as corporate meetings or training sessions, the scenarios are more realistic in their appearance, albeit still virtual.

Figure 8:
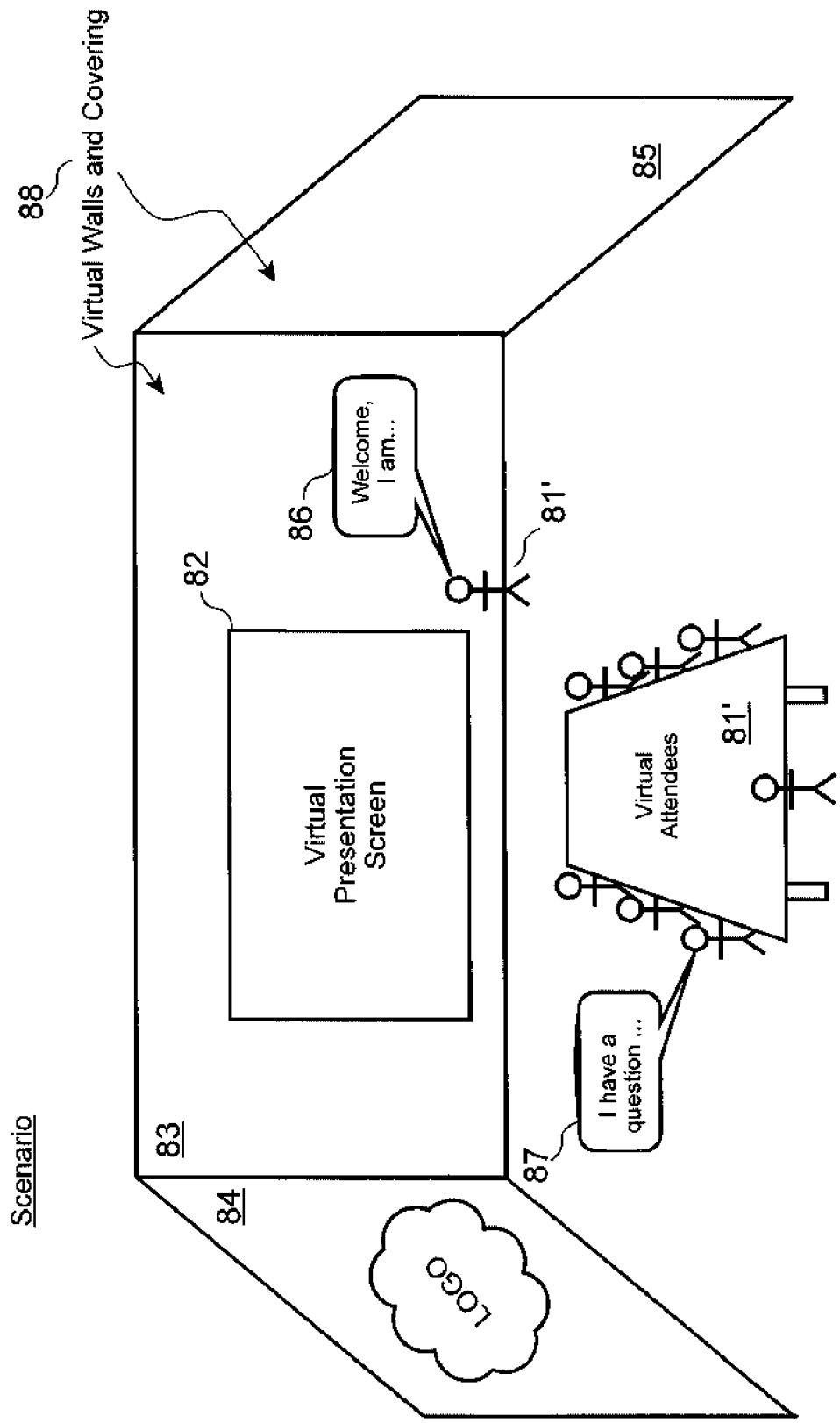
FIG. 8 illustrates a hypothetical three-dimensional view of a "world" scenario in which a virtual meeting, presentation, or conference is being held.

Turning to FIG. 8, an example depiction of such a realistic scenario is provided, in which the avatar (81') for the real meeting facilitator is shown along side a virtual presentation screen (82) as if the facilitator were in a real meeting room with walls (83, 84, 85), and a floor area where the avatars (81') of the meeting attendees are shown.

To enhance the experience, the virtual presentation screen may show a portion of the facilitator's actual terminal device's screen, such as a portion of a Microsoft Windows™ desktop interface, or may be filled with information provided to the Virtual World server from an application program, such as a mobile phone or PDA-based presentation program. Still further to enhance the virtual conference experience, the virtual walls are decorated according to the presenter's (or other administrator's) preferences, including coverings, skins, or lighting (88), and/or one or more company logos (84).

In such a scenario, the presenter or administrator of the virtual conference schedules, reserves, or otherwise configures these environment choices, including possibly restrictions as to which other users may be attendees. Such scheduling and reservation activities are usually performed in advance, and may need to be revised as the number of virtual attendees becomes more and more certain closer to time of the virtual conference.

For the purposes of this disclosure, the term "scheduling" of virtual world "resources" will be used to refer to such activities as requesting in advance, configuring, enabling, disabling, limiting, enumerating, revising, or otherwise controlling virtual environment characteristics, attendee lists, attendee capabilities, etc.

Problem Recognized by the Inventors

Figure 9:
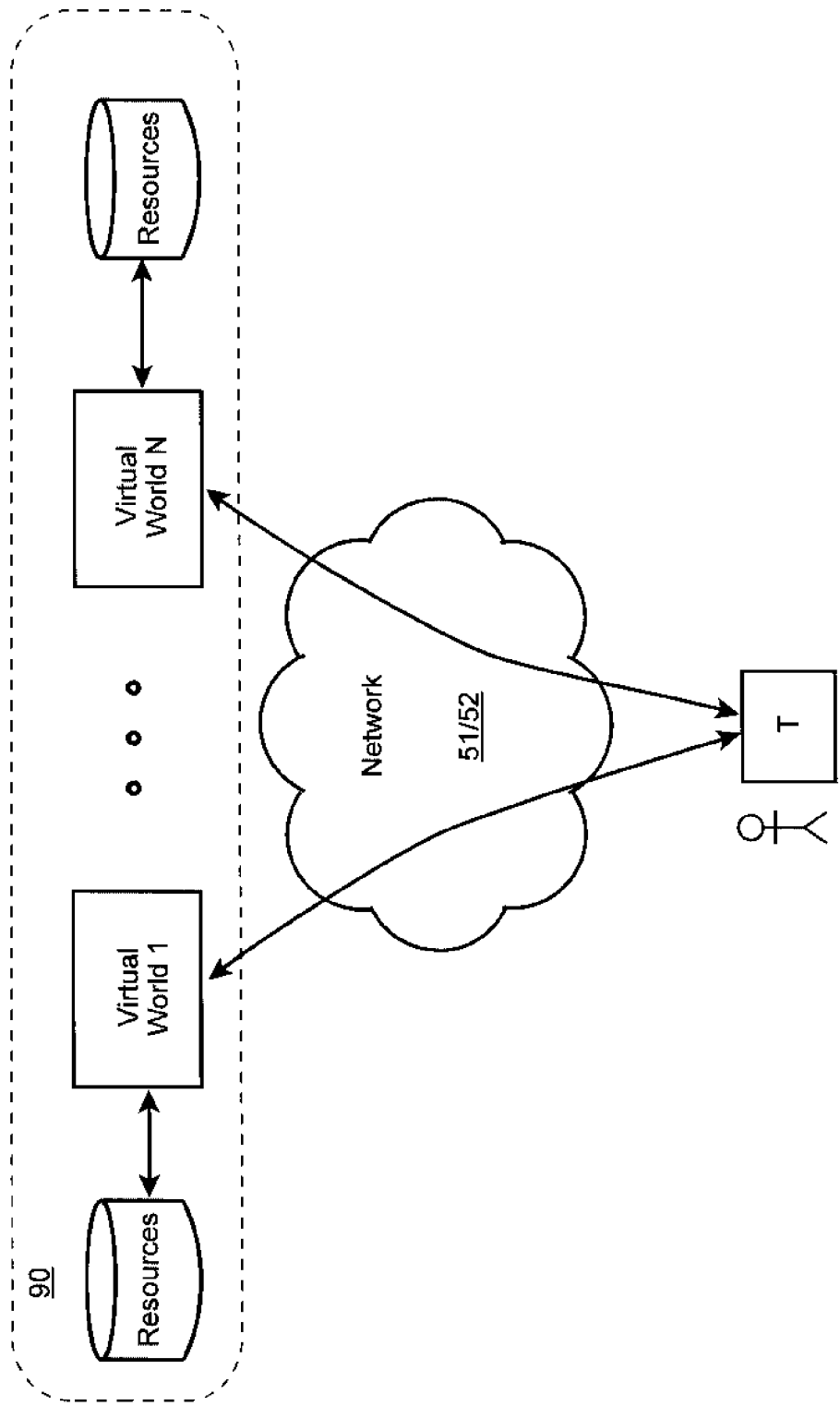
FIG. 9 shows a multi-virtual-world arrangement of systems in which the user is the only common functional point between the multiple virtual worlds.

The present invention solves a problem not recognized by those in the art, which is that shown in FIG. 9, in which multiple virtual world platforms and systems have evolved and been deployed, none of which being capable of interacting with each other. In many ways, it could be said that today's virtual worlds are "islands" to themselves due to their technical limitations (e.g. proprietary design natures), and due in part to their previous market appeal (e.g. only to their own client or user base).

However, it has been recognized by the present inventors that there are emerging cross-world needs by some users of virtual world services and systems. As persistent virtual worlds continue to attract a larger number of users, the need for fundamental services has become evident to the present inventors. One of those important services is comprehensive event and resource planning in virtual worlds, which provides for the reservation and scheduling of limited virtual resources.

The inventors have recognized that a need exists based on the issues observed in currently available solutions:

The current systems are confusing, inefficient, and incomplete. If they do exist, users don't know how to use them and they do not meet basic needs.

Having multiple users managing schedules increases the potential for multiple or duplicate bookings.

Conversely, having a single user managing schedules creates the potential for a scheduling bottleneck.

There is a general lack of awareness for what resources are available, their capabilities and any restrictions.

Currently, common solutions for this type of planning involves participants agreeing to use unrelated tools, such as group calendars, message boards, and in-world messaging. Some virtual worlds have separate applications to track meetings (or quests), however these applications are merely external group calendars.

The present invention is derived from the inventors' recognition of this problem. A cross-world framework is described herein which provides integrated scheduling and reservation of virtual world resources for specific scenarios, quests, events, etc. Users are enabled to access the Virtual World resource scheduling application from a website, or alternatively from an in-world user interface. The invention in one embodiment utilizes the "iCal" industry standard calendaring format, and includes user configurable cross-channel notifications.

Logical Processes of the Invention

Figure 10:
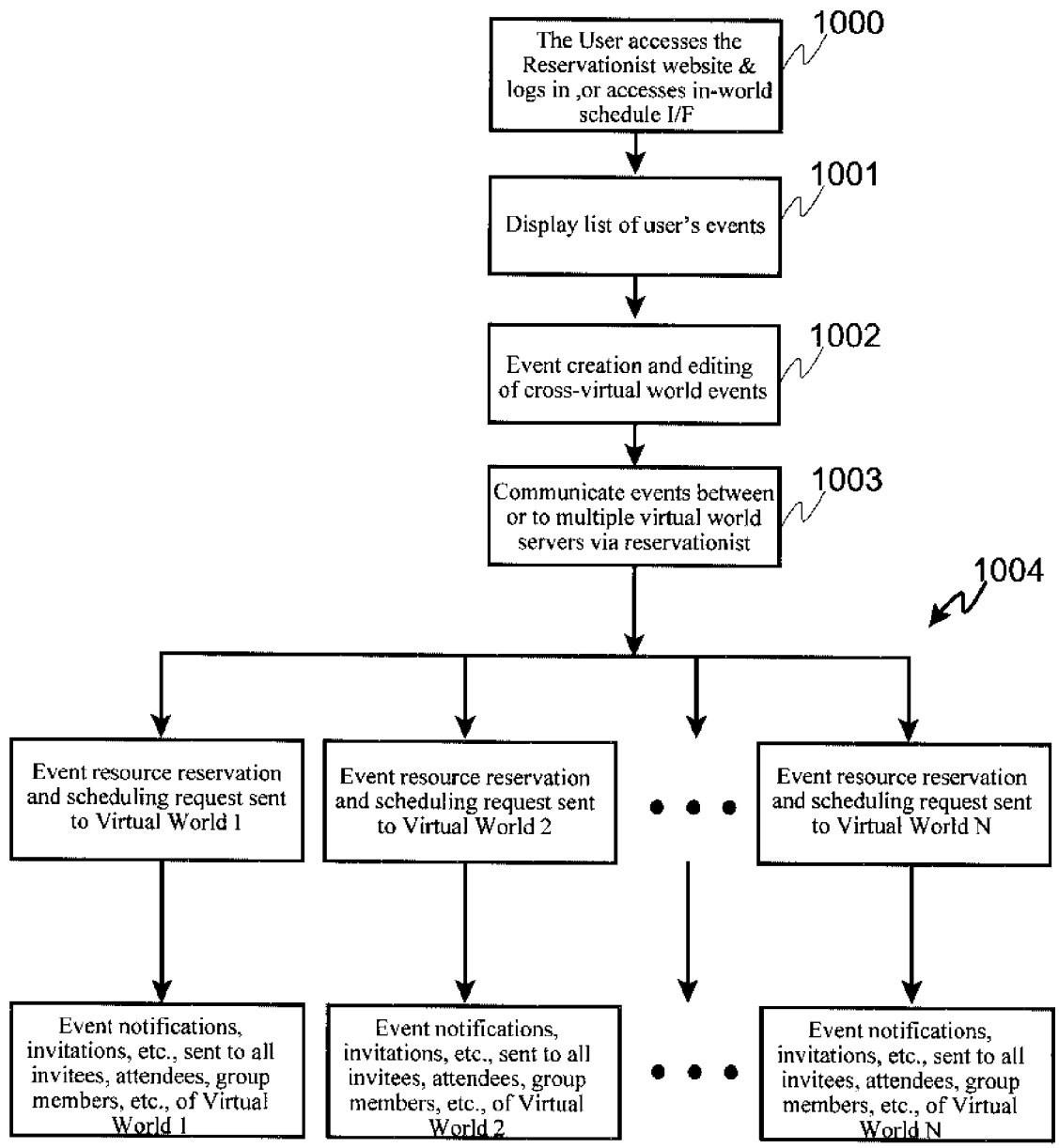
FIG. 10 illustrates a logical process according to the present invention.

The logical processes of the invention taken from a user's perspective are illustrated in FIG. 10:

(1) The user accesses the website and logs in, or accesses the in-world scheduling interface (1000).

(2) A list of the user's events are displayed, optionally sorted for the events which the user owns (e.g. events which the user can change, configure, etc.), and events to which the user is invited (1001).

(3) The user is enabled to edit an existing event, or to schedule a new event (1002). Events are comprised of, but not limited to:

(a) Time—user selects a date and time for the event. The user can specify the event duration and if the event repeats.

(b) Participants—user selects participants for the event. The user can select from a list of existing contacts or enter new contacts. The contacts do not necessarily have to be registered with the virtual world in which the event will occur (because they could register prior to attending the event). Optionally, the user can import a list of contacts as part of profile management. For those virtual world platforms that provide external APIs, contacts from world "buddy lists" can be automatically accessed.

(c) Resources i. The user can browse for available resources, browse for a specific resource, or browse using keywords and/or characteristics (for example, environment type, number of seats, screens, simulations, objects, tools, HUD's, etc.).

ii. Each resource preferably includes a description that explains the capacity, capabilities, etc. Some resources have required attendees (for example, spaces that require additional explanation or support).

iii. The user can optionally specify that the event description can be modified using a wiki-style model in which participants can modify the agenda, invite others, etc.

iv. The user can also specify that the event is private, which limits access to the virtual resource to only those on the invitee list.

v. For virtual world platforms that allow it, "dynamic resources" can be created that allow the user to specify their requirements, and the resource automatically reconfigures itself to match.

(4) The event is communicated and cross-scheduled across multiple platforms to achieve cross platform scheduling (1003).

(5) Participants receive invitations to the event (1004):

(a) For users that are registered with the system, they receive the invitation based on their notification preferences (e-mail, IM application, in-world, etc.). Users can respond to the invitation by replying to the invitation email, responding to the IM invitation, or responding to the in-world notice.

(b) For users that are not registered with the system, they receive an email with a link to view the event details. Users can respond to the invitation using the website.

An example user interface of an Event Detail page includes, but is not limited to:

(1) Date/Time (scheduled time and adjusted for the local time of the user);
  (2) Participants and response status;
  (3) Resource (including a link into the virtual world);
  (4) Reminder settings, optionally including when and how the user would like to be reminded of the event;
  (5) "Wiki" content edit controls, if enabled;

In participating virtual worlds, scheduling hubs will be optionally provided where users can see sample rooms, daily schedules, and learn how to use various resources. Additionally, each location displays a feed of the day's events. Using this interactive display, users can navigate to other days to view the schedule of events for a particular location.

Further, this system will also optionally include a link to the reservation system, which would pre-populate the creation of a new event with the selected time/resources. The system will allow for the configuration of "buffer time" to allow for the reset/reconfigure of resources between meetings and to allow for participants to leave/arrive.

System Arrangement and Diagrams

Figure 11:
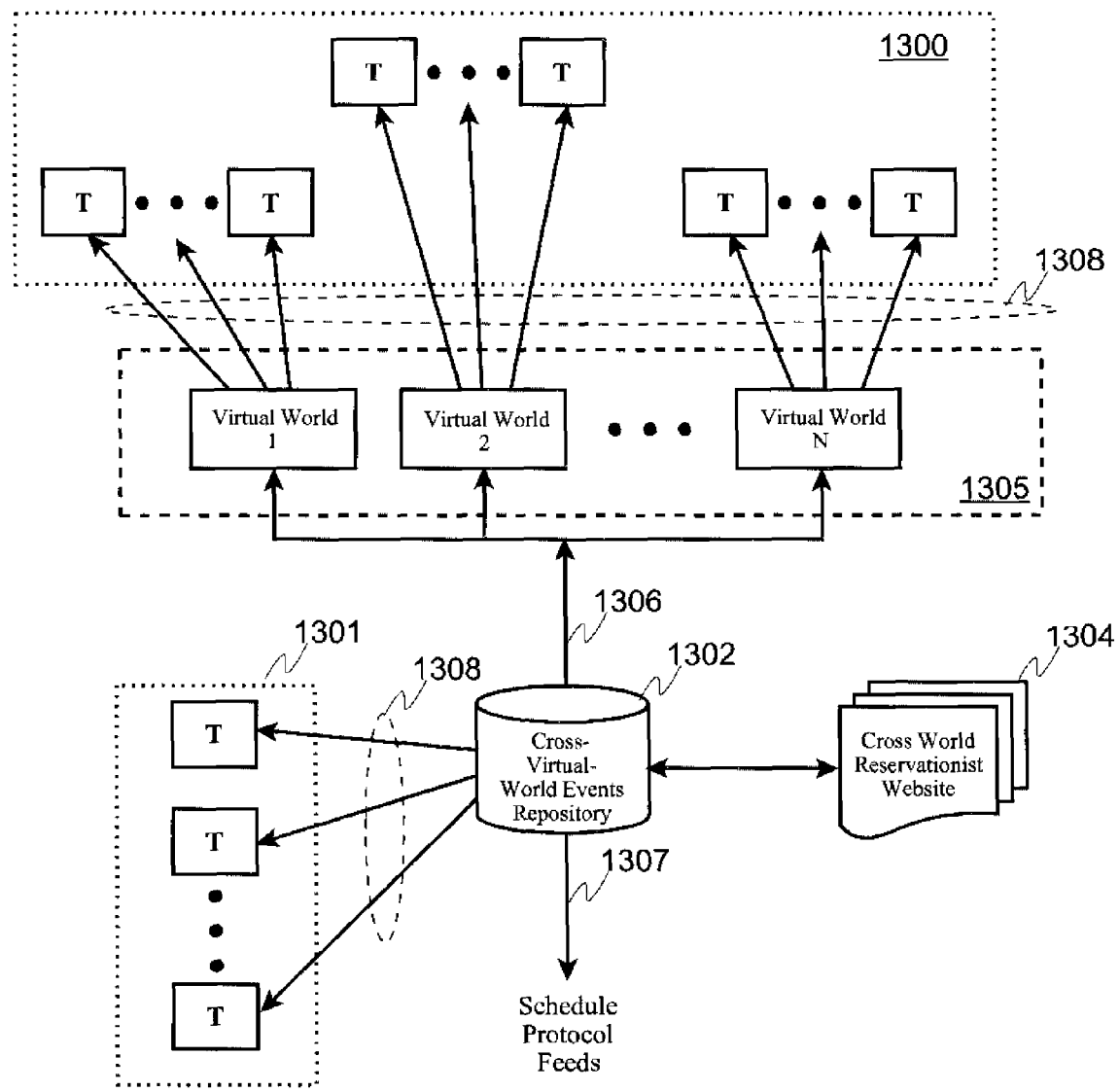
FIG. 11 illustrates interactions between components of an arrangement of systems according to the present invention.

Turning now to FIG. 11, a centralized or distributed events repository (1302) is provided, which can be accessed through a web page or site (1304), or alternatively, through one or more in-world interfaces (not shown).

The events repository (1302) coordinates the reservation, configuration, and transmission of notifications and reminders (1306, 1308) between users' terminals (1300, 1301), and multiple virtual world systems (1305), as well as optionally outputs scheduling protocol feeds (1307), according to the logical processes described herein.

While any suitable scheduling protocol can be used within the embodiment of the invention, the scheduling protocol feeds (1307) are preferably adherent to or compliant with to the Internet Engineering Task Force ("IETF") Network Working Group's Request for Comments ("RFC") 2442 "Internet Calendaring and Scheduling Core Object Specification" ("iCal"), copyright 1998 by The Internet Society. This "standard" is publicly available via the IETF, and is widely understood.

Figure 1A:
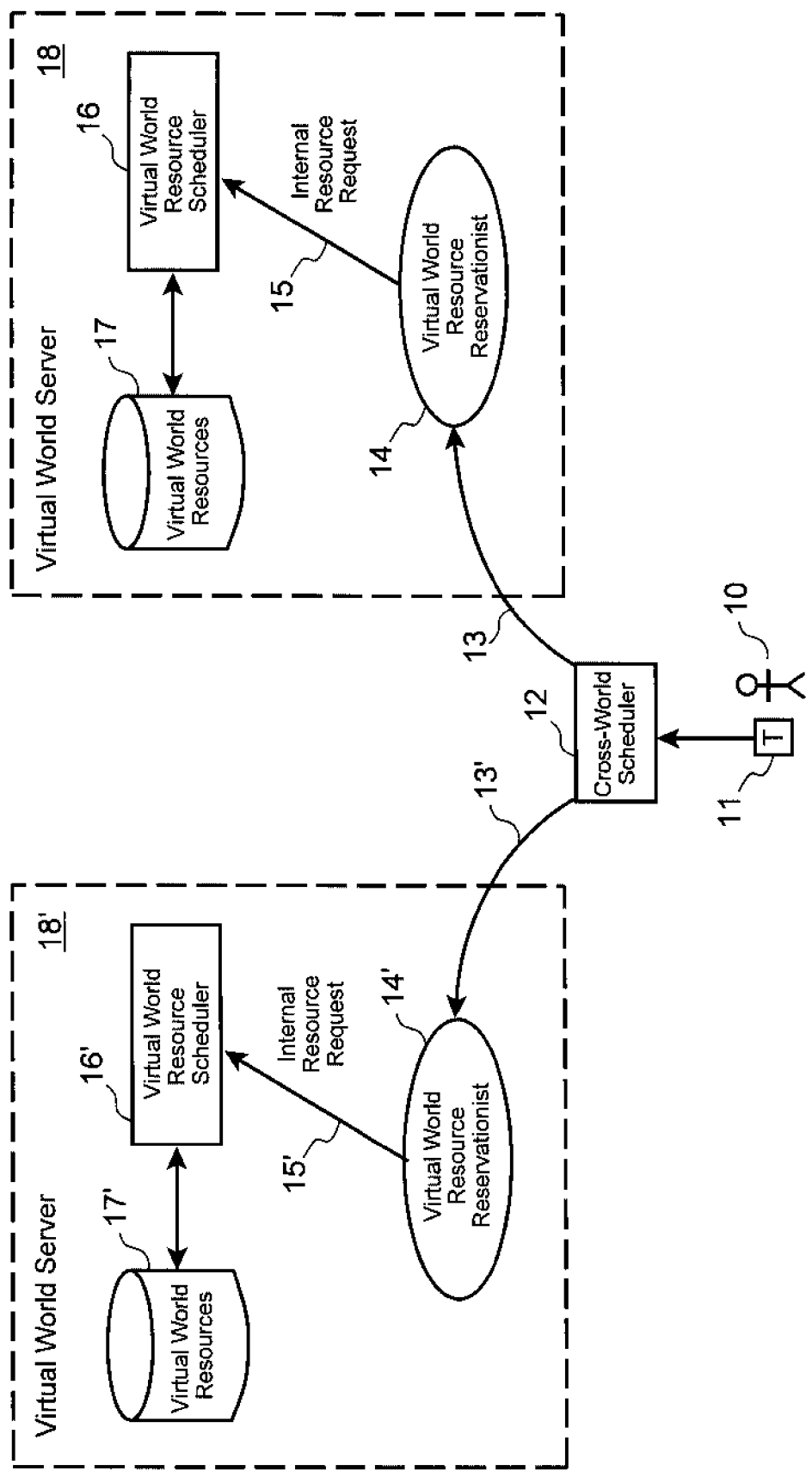
FIGS. 1a and 1b set forth a system diagrams according to the invention for two alternative embodiments.

Turning to FIG. 1*a*, an embodiment of the invention is shown in which the user (10) utilizes his or her terminal device (11) to submit or create a scheduling request to a cross-virtual-world resource reservationist (12), which then submits on the user's behalf two or more messages (13, 13') to a cross-virtual-world resource reservationist or scheduling proxy (14, 14') in each affected virtual world server (18, 18').

The cross-virtual-world resource reservationist may be an application program, such as a C or Python program, running on or within each Virtual World server, or it may be a program "logged into" each Virtual World server as a "user", thereby emulating the actions of a Virtual World user.

The cross-virtual-world resource reservationist then creates one or more internal requests to each internal Virtual World resource reservationist (16, 16') for one or more Virtual World resources (17, 17') in order to accomplish the cross-world scheduling of resources.

This scheduling may result in in-world messages or notifications to each invitee. Further, the cross-virtual-world resource reservationist (12) may initiate other "out of world" notifications, such as emails, text messages, iCal messages, etc., in order to notify, to remind or confirm each attendee.

Figure 1B:
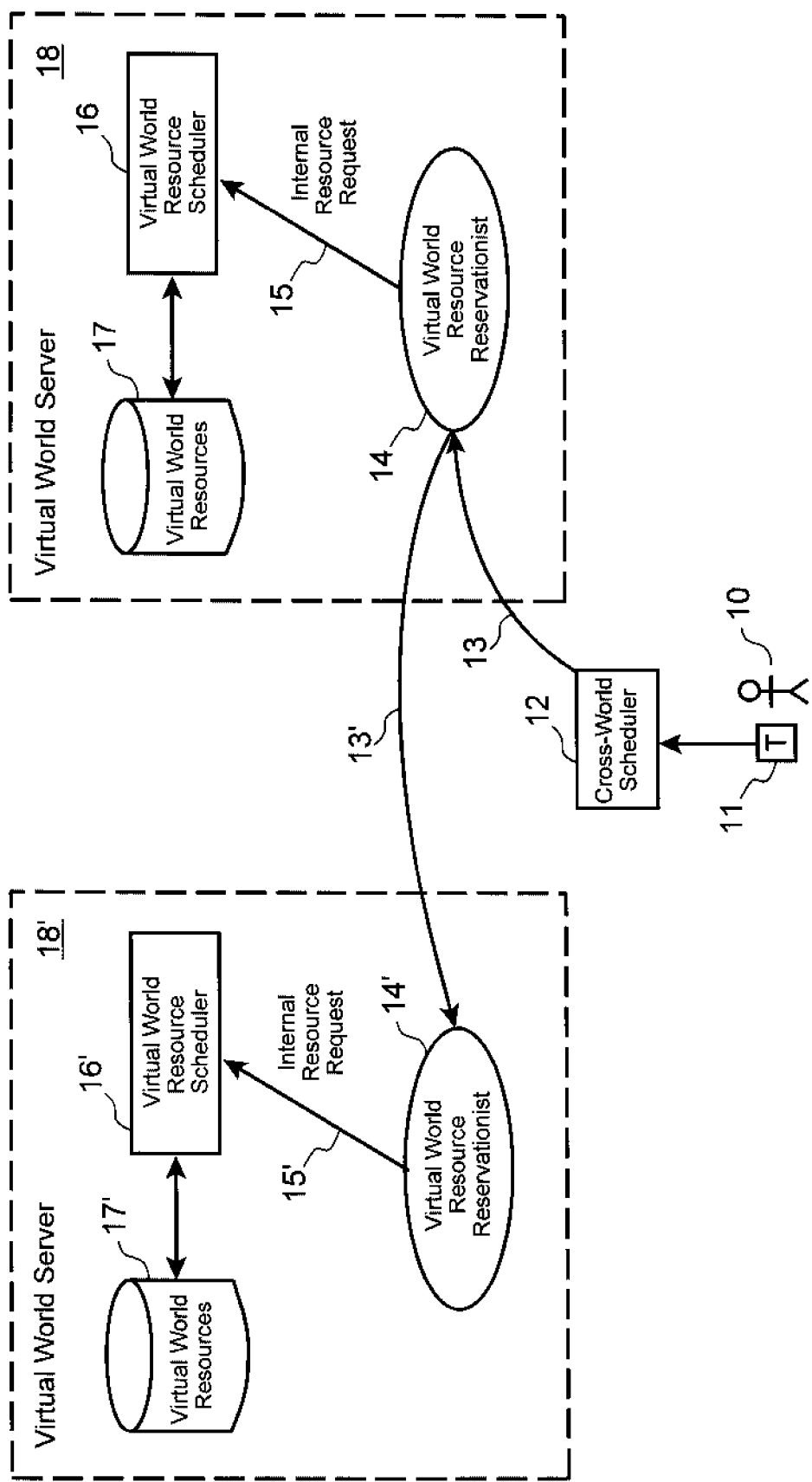

Turning now to FIG. 1b, an alternative embodiment of the invention is shown, which is similar to that of FIG. 1a, except that the cross-virtual-world resource reservationist (12) creates a message to a first in-world resource reservationist (14), and the first in-world resource reservationist responds with communication directly (13') to one or more other virtual secretaries (14') in other worlds. In this embodiment, the user (10) is enabled to schedule resources in multiple worlds while only having an account or profile in one of the affected virtual worlds.

Service-based Embodiments

Alternative embodiments of the present invention include some or all of the foregoing logical processes and functions of the invention being provided by configuring software, deploying software, downloading software, distributing software, or remotely serving clients in an on demand environment.

Software Deployment Embodiment. According to one embodiment of the invention, the methods and processes of the invention are distributed or deployed as a service by a service provider to a client's computing system(s).

Figure 3A:
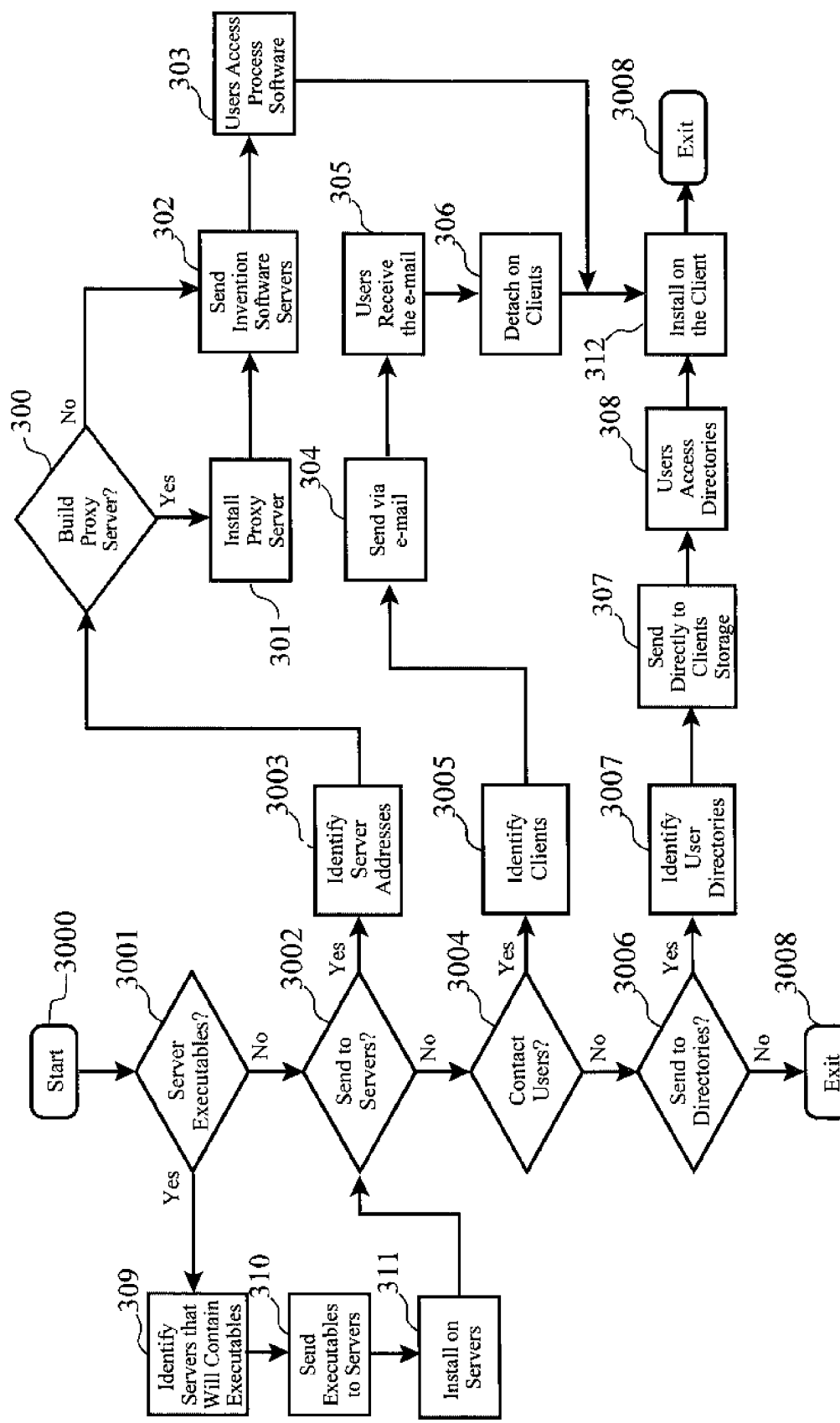
FIG. 3a sets forth a logical process to deploy software to a client in which the deployed software embodies the methods and processes of the present and related inventions.

Turning to FIG. 3a, the deployment process begins (3000) by determining (3001) if there are any programs that will reside on a server or servers when the process software is executed. If this is the case, then the servers that will contain the executables are identified (309). The process software for the server or servers is transferred directly to the servers storage via FTP or some other protocol or by copying through the use of a shared files system (310). The process software is then installed on the servers (311).

Next a determination is made on whether the process software is to be deployed by having users access the process software on a server or servers (3002). If the users are to access the process software on servers, then the server addresses that will store the process software are identified (3003).

In step (3004) a determination is made whether the process software is to be developed by sending the process software to users via e-mail. The set of users where the process software will be deployed are identified together with the addresses of the user client computers (3005). The process software is sent via e-mail to each of the user's client computers. The users then receive the e-mail (305) and then detach the process software from the e-mail to a directory on their client computers (306). The user executes the program that installs the process software on his client computer (312) then exits the process (3008).

A determination is made if a proxy server is to be built (300) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required then the proxy server is installed (301). The process software is sent to the servers either via a protocol such as FTP or it is copied directly from the source files to the server files via file sharing (302). Another embodiment would be to send a transaction to the servers that contained the process software and have the server process the transaction, then receive and copy the process software to the server's file system. Once the process software is stored at the servers, the users via their client computers, then access the process software on the servers and copy to their client computers file systems (303). Another embodiment is to have the servers automatically copy the process software to each client and then run the installation program for the process software at each client computer. The user executes the program that installs the process software on his client computer (312) then exits the process (3008).

Lastly, a determination is made on whether the process software will be sent directly to user directories on their client computers (3006). If so, the user directories are identified (3007). The process software is transferred directly to the user's client computer directory (307). This can be done in several ways such as, but not limited to, sharing of the file system directories and then copying from the sender's file system to the recipient user's file system or alternatively using a transfer protocol such as File Transfer Protocol ("FTP"). The users access the directories on their client file systems in preparation for installing the process software (308). The user executes the program that installs the process software on his client computer (312) then exits the process (3008).

Software Integration Embodiment. According to another embodiment of the present invention, software embodying the methods and processes disclosed herein are integrated as a service by a service provider to other software applications, applets, or computing systems.

Integration of the invention generally includes providing for the process software to coexist with applications, operating systems and network operating systems software and then installing the process software on the clients and servers in the environment where the process software will function.

Generally speaking, the first task is to identify any software on the clients and servers including the network operating system where the process software will be deployed that are required by the process software or that work in conjunction with the process software. This includes the network operating system that is software that enhances a basic operating system by adding networking features. Next, the software applications and version numbers will be identified and compared to the list of software applications and version numbers that have been tested to work with the process software. Those software applications that are missing or that do not match the correct version will be upgraded with the correct version numbers. Program instructions that pass parameters from the process software to the software applications will be checked to ensure the parameter lists matches the parameter lists required by the process software. Conversely parameters passed by the software applications to the process software will be checked to ensure the parameters match the parameters required by the process software. The client and server operating systems including the network operating systems will be identified and compared to the list of operating systems, version numbers and network software that have been tested to work with the process software. Those operating systems, version numbers and network software that do not match the list of tested operating systems and version numbers will be upgraded on the clients and servers to the required level.

After ensuring that the software, where the process software is to be deployed, is at the correct version level that has been tested to work with the process software, the integration is completed by installing the process software on the clients and servers.

Figure 3B:
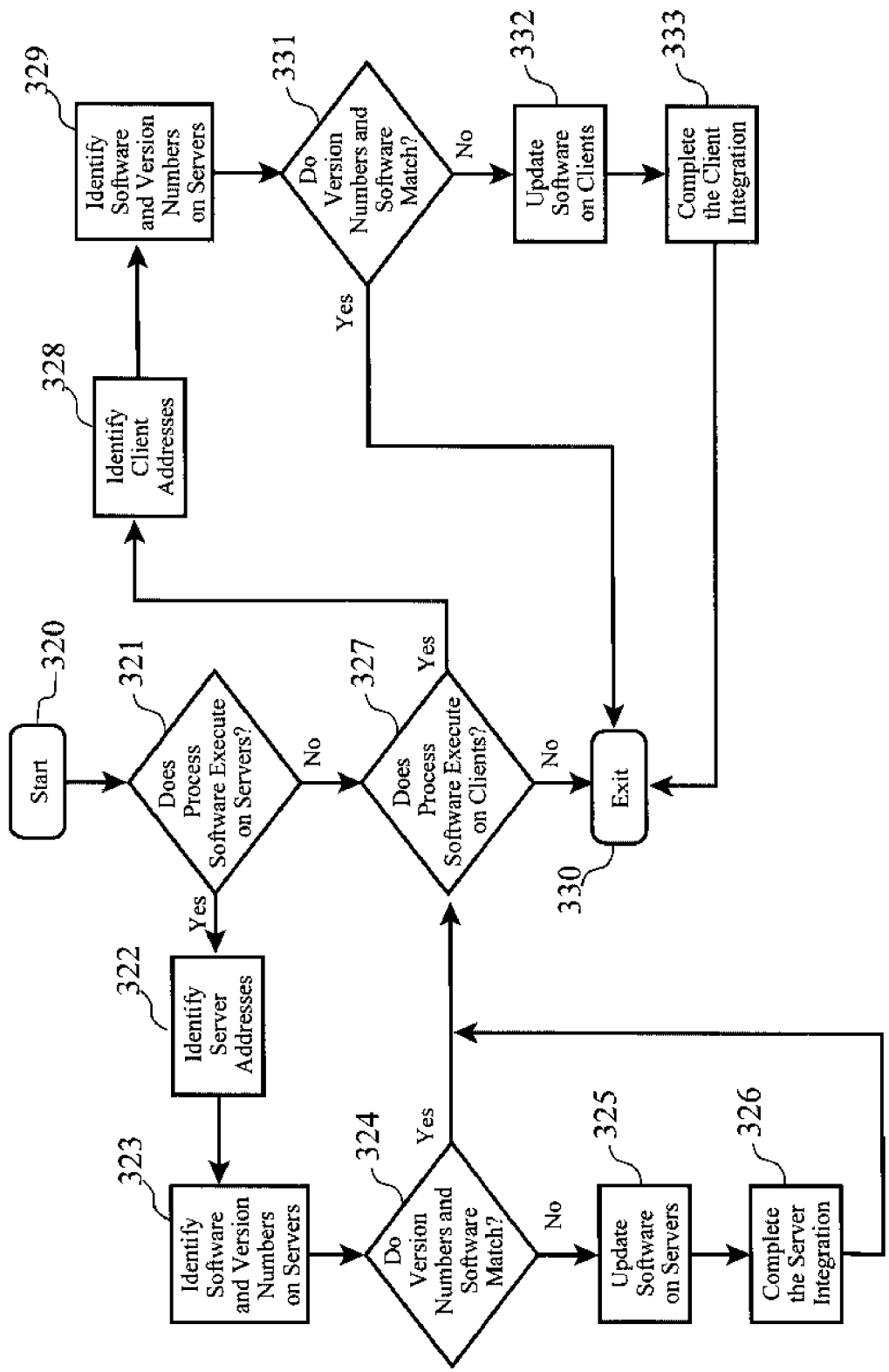
FIG. 3b sets forth a logical process to integrate software to other software programs in which the integrated software embodies the methods and processes of the present and related inventions.

Turning to FIG. 3b, details of the integration process according to the invention are shown. Integrating begins (320) by determining if there are any process software programs that will execute on a server or servers (321). If this is not the case, then integration proceeds to (327). If this is the case, then the server addresses are identified (322). The servers are checked to see if they contain software that includes the operating system ("OS"), applications, and network operating systems ("NOS"), together with their version numbers, that have been tested with the process software (323). The servers are also checked to determine if there is any missing software that is required by the process software (323).

A determination is made if the version numbers match the version numbers of OS, applications and NOS that have been tested with the process software (324). If all of the versions match, then processing continues (327). Otherwise, if one or more of the version numbers do not match, then the unmatched versions are updated on the server or servers with the correct versions (325). Additionally, if there is missing required software, then it is updated on the server or servers (325). The server integration is completed by installing the process software (326).

Step (327) which follows either (321), (324), or (326) determines if there are any programs of the process software that will execute on the clients. If no process software programs execute on the clients, the integration proceeds to (330) and exits. If this is not the case, then the client addresses are identified (328).

The clients are checked to see if they contain software that includes the operating system ("OS"), applications, and network operating systems ("NOS"), together with their version numbers, that have been tested with the process software (329). The clients are also checked to determine if there is any missing software that is required by the process software (329).

A determination is made if the version numbers match the version numbers of OS, applications and NOS that have been tested with the process software 331. If all of the versions match and there is no missing required software, then the integration proceeds to (330) and exits.

If one or more of the version numbers do not match, then the unmatched versions are updated on the clients with the correct versions (332). In addition, if there is missing required software then it is updated on the clients (332). The client integration is completed by installing the process software on the clients (333). The integration proceeds to (330) and exits.

Application Programming Interface Embodiment. In another embodiment, the invention may be realized as a service or functionality available to other systems and devices via an Application Programming Interface ("API"). One such embodiment is to provide the service to a client system from a server system as a web service.

On-Demand Computing Services Embodiment. According to another aspect of the present invention, the processes and methods disclosed herein are provided through an on demand computing architecture to render service to a client by a service provider.

Figure 3C:
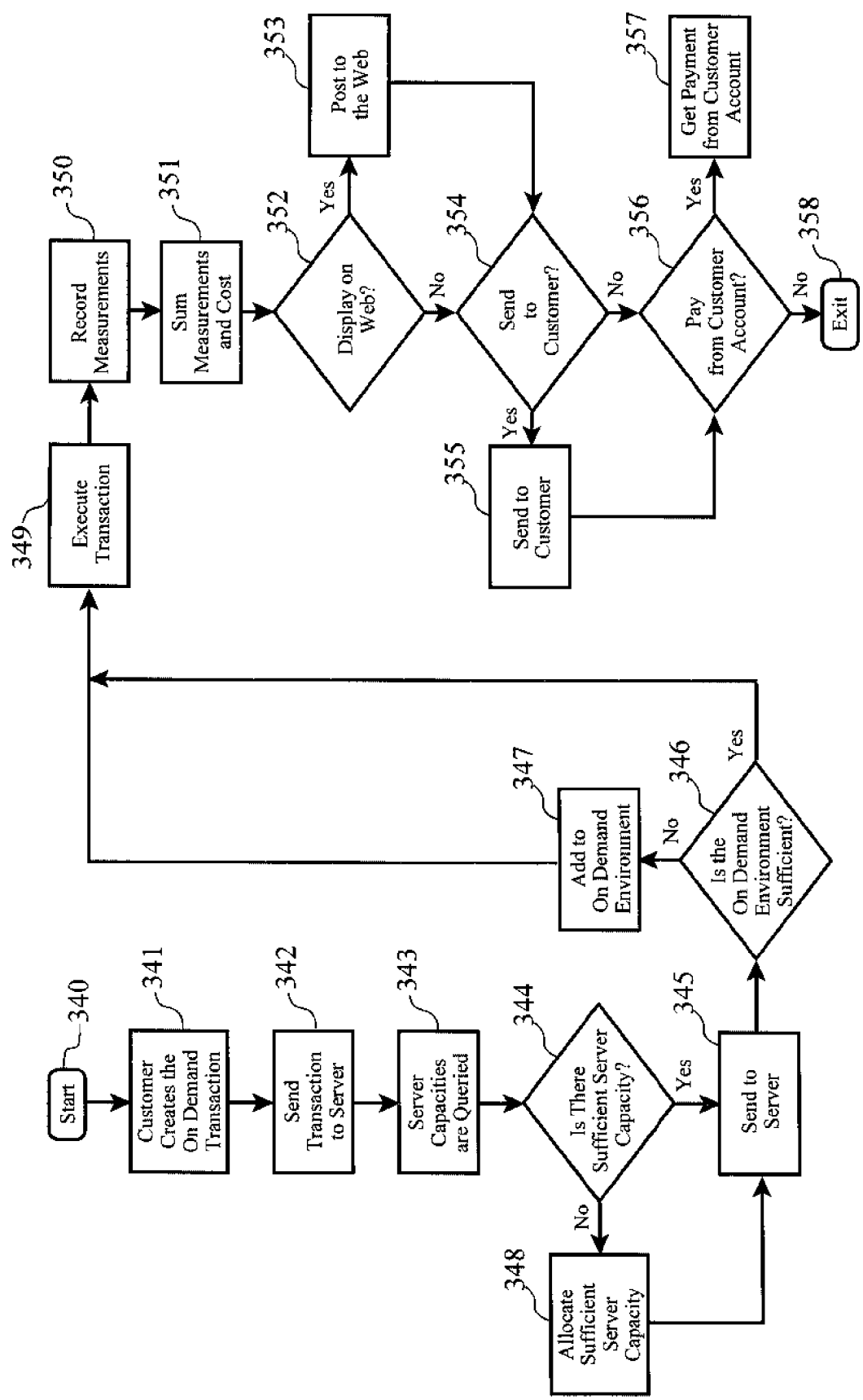
FIG. 3c sets forth a logical process to execute software on behalf of a client in an on-demand computing system, in which the executed software embodies the methods and processes of the present and related inventions.

Turning to FIG. 3c, generally speaking, the process software embodying the methods disclosed herein is shared, simultaneously serving multiple customers in a flexible, automated fashion. It is standardized, requiring little customization and it is scaleable, providing capacity on demand in a pay-as-you-go model.

The process software can be stored on a shared file system accessible from one or more servers. The process software is executed via transactions that contain data and server processing requests that use CPU units on the accessed server. CPU units are units of time such as minutes, seconds, hours on the central processor of the server. Additionally, the assessed server may make requests of other servers that require CPU units. CPU units are an example that represents but one measurement of use. Other measurements of use include but are not limited to network bandwidth, memory usage, storage usage, packet transfers, complete transactions, etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to effect the performance of that server, other servers are accessed to increase the capacity and to share the workload. Likewise, when other measurements of use such as network bandwidth, memory usage, storage usage, etc. approach a capacity so as to effect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the computer which then remits payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

FIG. 3c sets forth a detailed logical process which makes the present invention available to a client through an On-Demand process. A transaction is created that contains the unique customer identification, the requested service type and any service parameters that further specify the type of service (341). The transaction is then sent to the main server (342). In an On-Demand environment the main server can initially be the only server, then as capacity is consumed other servers are added to the On-Demand environment.

The server central processing unit ("CPU") capacities in the On-Demand environment are queried (343). The CPU requirement of the transaction is estimated, then the servers available CPU capacity in the On-Demand environment are compared to the transaction CPU requirement to see if there is sufficient CPU available capacity in any server to process the transaction (344). If there is not sufficient server CPU available capacity, then additional server CPU capacity is allocated to process the transaction (348). If there was already sufficient available CPU capacity, then the transaction is sent to a selected server (345).

Before executing the transaction, a check is made of the remaining On-Demand environment to determine if the environment has sufficient available capacity for processing the transaction. This environment capacity consists of such things as, but not limited to, network bandwidth, processor memory, storage etc. (345). If there is not sufficient available capacity, then capacity will be added to the On-Demand environment (347). Next, the required software to process the transaction is accessed, loaded into memory, then the transaction is executed (349).

The usage measurements are recorded (350). The usage measurements consists of the portions of those functions in the On-Demand environment that are used to process the transaction. The usage of such functions as, but not limited to, network bandwidth, processor memory, storage and CPU cycles are what is recorded. The usage measurements are summed, multiplied by unit costs and then recorded as a charge to the requesting customer (351).

If the customer has requested that the On-Demand costs be posted to a web site (352), then they are posted (353). If the customer has requested that the On-Demand costs be sent via e-mail to a customer address (354), then they are sent (355). If the customer has requested that the On-Demand costs be paid directly from a customer account (356), then payment is received directly from the customer account (357). The last step is to exit the On-Demand process.

Grid or Parallel Processing Embodiment. According to another embodiment of the present invention, multiple computers are used to simultaneously process individual audio tracks, individual audio snippets, or a combination of both, to yield output with less delay. Such a parallel computing approach may be realized using multiple discrete systems (e.g. a plurality of servers, clients, or both), or may be realized as an internal multiprocessing task (e.g. a single system with parallel processing capabilities).

VPN Deployment Embodiment. According to another aspect of the present invention, the methods and processes described herein may be embodied in part or in entirety in software which can be deployed to third parties as part of a service, wherein a third party VPN service is offered as a secure deployment vehicle or wherein a VPN is build on-demand as required for a specific deployment.

A virtual private network ("VPN") is any combination of technologies that can be used to secure a connection through an otherwise unsecured or untrusted network. VPNs improve security and reduce operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee. Access to the software via a VPN can be provided as a service by specifically constructing the VPN for purposes of delivery or execution of the process software (i.e. the software resides elsewhere) wherein the lifetime of the VPN is limited to a given period of time or a given number of deployments based on an amount paid.

The process software may be deployed, accessed and executed through either a remote-access or a site-to-site VPN. When using the remote-access VPNs the process software is deployed, accessed and executed via the secure, encrypted connections between a company's private network and remote users through a third-party service provider. The enterprise service provider ("ESP") sets a network access server ("NAS") and provides the remote users with desktop client software for their computers. The telecommuters can then dial a toll-free number to attach directly via a cable or DSL modem to reach the NAS and use their VPN client software to access the corporate network and to access, download and execute the process software.

When using the site-to-site VPN, the process software is deployed, accessed and executed through the use of dedicated equipment and large-scale encryption that are used to connect a company's multiple fixed sites over a public network such as the Internet.

The process software is transported over the VPN via tunneling which is the process of placing an entire packet within another packet and sending it over the network. The protocol of the outer packet is understood by the network and both points, called tunnel interfaces, where the packet enters and exits the network.

Figure 3D:
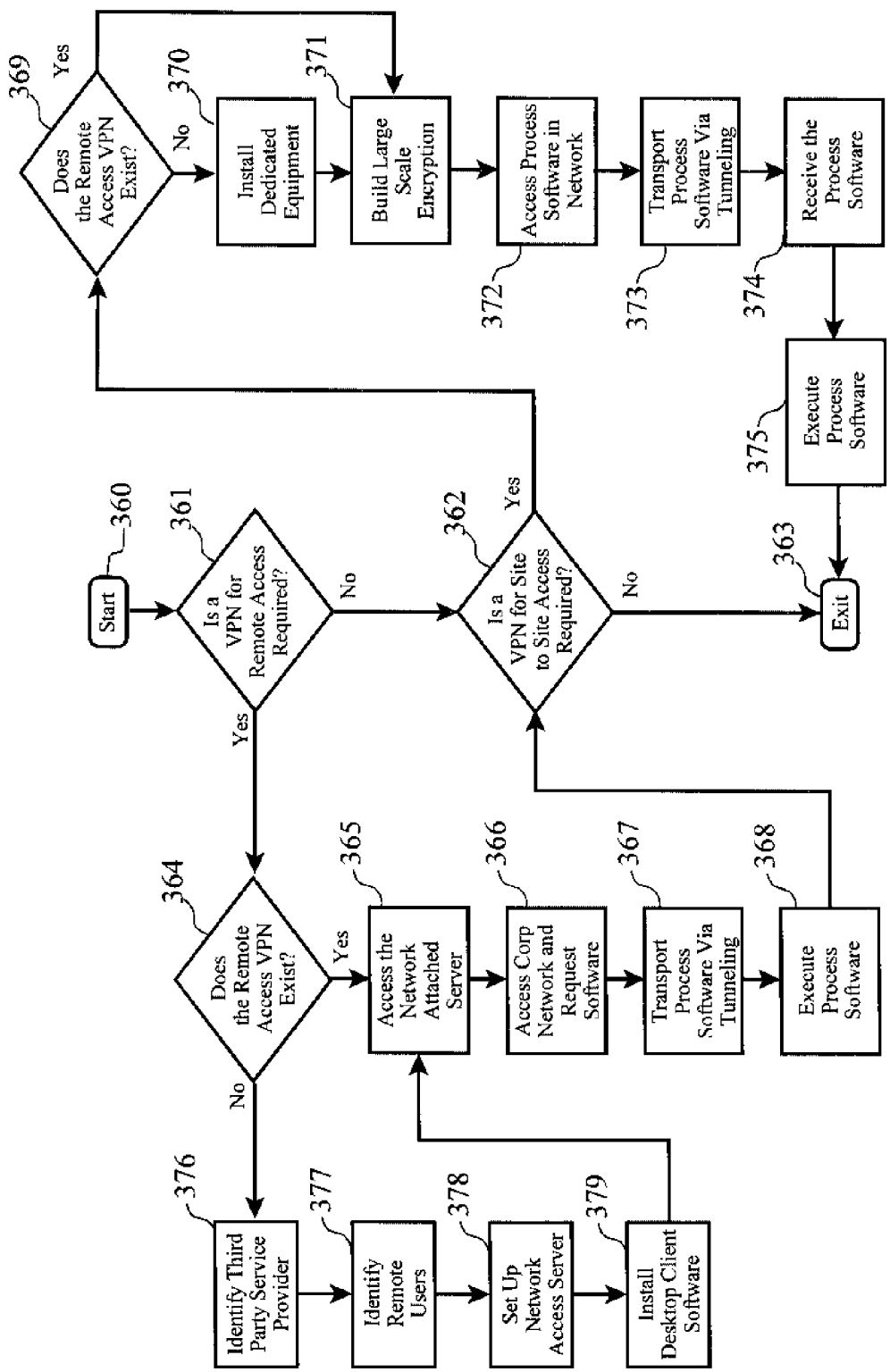
FIG. 3d sets forth a logical process to deploy software to a client via a virtual private network, in which the deployed software embodies the methods and processes of the present and related inventions.

Turning to FIG. 3d, VPN deployment process starts (360) by determining if a VPN for remote access is required (361). If it is not required, then proceed to (362). If it is required, then determine if the remote access VPN exits (364).

If a VPN does exist, then the VPN deployment process proceeds (365) to identify a third party provider that will provide the secure, encrypted connections between the company's private network and the company's remote users (376). The company's remote users are identified (377). The third party provider then sets up a network access server ("NAS") (378) that allows the remote users to dial a toll free number or attach directly via a broadband modem to access, download and install the desktop client software for the remote-access VPN (379).

After the remote access VPN has been built or if it has been previously installed, the remote users can access the process software by dialing into the NAS or attaching directly via a cable or DSL modem into the NAS (365). This allows entry into the corporate network where the process software is accessed (366). The process software is transported to the remote user's desktop over the network via tunneling. That is the process software is divided into packets and each packet including the data and protocol is placed within another packet (367). When the process software arrives at the remote user's desktop, it is removed from the packets, reconstituted and then is executed on the remote users desktop (368).

A determination is made to see if a VPN for site to site access is required (362). If it is not required, then proceed to exit the process (363). Otherwise, determine if the site to site VPN exists (369). If it does exist, then proceed to (372). Otherwise, install the dedicated equipment required to establish a site to site VPN (370). Then, build the large scale encryption into the VPN (371).

After the site to site VPN has been built or if it had been previously established, the users access the process software via the VPN (372). The process software is transported to the site users over the network via tunneling. That is the process software is divided into packets and each packet including the data and protocol is placed within another packet (374). When the process software arrives at the remote user's desktop, it is removed from the packets, reconstituted and is executed on the site users desktop (375). Proceed to exit the process (363).

Conclusion

While certain examples and details of a preferred embodiment have been disclosed, it will be recognized by those skilled in the art that variations in implementation such as use of different programming methodologies, computing platforms, and processing technologies, may be adopted without departing from the spirit and scope of the present invention. Therefore, the scope of the invention should be determined by the following claims.

What is claimed is:

1. An automated method for a cross-virtual-world resource scheduling framework comprising:

providing to a user a scheduling interface on a user interface portion of a computing platform, the scheduling interface allowing creation of a cross-world virtual world event, wherein the cross-world virtual event is to be scheduled in a plurality of virtual world computing platforms, the plurality including at least two virtual world computing platforms which are incapable of interaction between the at least two virtual world computing platforms;

creating by a computing platform a new cross-world virtual world event to be associated with a virtual identity for said user, wherein the new cross-world virtual world event is scheduled and reserved to occur at a future time in said at least two virtual world computing platforms which are incapable of interaction;

communicating by a computing platform the created event to said plurality of virtual world computing platforms using one or more cross-channel notifications to achieve cross platform scheduling among the at least two virtual world computing platforms which are incapable of interaction; and notifying by a computing platform a plurality of participants other than said user of said created event, wherein the plurality of participants includes at least one participant from at least each of the at least two virtual world computing platforms which are incapable of interaction, and wherein the notifying is performed using one or more cross-channel notifications.

2. The method as set forth in claim 1 wherein said scheduling interface comprises an in-world interface.

3. The method as set forth in claim 1 wherein said scheduling interface comprises a user interface external to an virtual world.

4. The method as set forth in claim 1 wherein said created cross-world event comprises one or more user selections and inputs selected from the group consisting of an event start time, an event duration, a list of event participants, and designation of participants' home virtual worlds.

5. The method as set forth in claim 1 wherein said creating a cross-world event further comprises importing a list of contacts as part of profile management.

6. The method as set forth in claim 5 wherein said importing a list of contacts further comprises importing a buddy list via an application programming interface.

7. The method as set forth in claim 1 wherein said creating a cross-world event further comprises specifying one or more virtual world resources for each affected virtual world.

8. The method as set forth in claim 7 wherein said specifying virtual world resources comprises at least one step selected from the group consisting of browsing a list of available resources, browsing for a specific resource, browsing using keywords, browsing using resource characteristics.

9. The method as set forth in claim 8 wherein said browsing using resource characteristics comprises browsing by a characteristic selected from the group of environment type, number of seats, number of screens, number of simulations, number objects, number tools, and number of heads up displays.

10. The method as set forth in claim 1 wherein said creating a cross-world event further comprises receiving an option selection from said user to allow event invitees to modify the event using a wiki-style model.

11. The method as set forth in claim 1 wherein said of creating a cross-world event further comprises receiving an option selection from said user to designate the event as private, thereby limiting access to the event to only those on the invitee list.

12. The method as set forth in claim 1 wherein said creating a cross-world event further comprises receiving an option from said user to designate the event as dynamic, thereby allowing the user to specify initial event resource requirements and enabling automatic resource reconfiguration by each virtual world server to match event requirements as the requirements change.

13. The method as set forth in claim 1 wherein said communicating the created cross-world event to a plurality of virtual world platforms comprises sending a scheduling request compliant with Internet Engineering Task Force Request for Comments number 2445, version 1998.

14. The method as set forth in claim 1 wherein said notifying participants comprises notifying a user within a virtual world common to said user.

15. The method as set forth in claim 1 wherein said notifying participants comprises notifying a user within a different virtual world to said user.

16. The method as set forth in claim 1 wherein said notifying participants comprises notifying a user via a communications channel external to a virtual world.

17. The method as set forth in claim 16 wherein said external communications channel is selected from the group consisting of an electronic mail, a text message, an instant message, a facsimile transmission, a web page entry, and a voice message.

18. The method as set forth in claim 1 further comprising providing a scheduling hub whereby users can preview sample rooms, daily schedules, and learn how to use various resources.

19. A computer program product for a cross-virtual-world resource scheduling framework comprising:

a tangible, computer-readable storage memory device; and
one or more computer instructions encoded by said device configured to cause a processor to perform the steps of:
providing to a user a scheduling interface on a user interface portion of a computing platform, the scheduling interface allowing creation of a cross-world virtual world event, wherein the cross-world virtual event is to be scheduled in a plurality of virtual world computing platforms, the plurality including at least two virtual world computing platforms which are incapable of interaction between the at least two virtual world computing platforms;

creating by a computing platform a new cross-world virtual world event to be associated with a virtual identity for said user, wherein the new cross-world virtual world event is scheduled and reserved to occur at a future time in said at least two virtual world computing platforms which are incapable of interaction;

communicating by a computing platform the created event to said plurality of virtual world computing platforms using one or more cross-channel notifications to achieve cross platform scheduling among the at least two virtual world computing platforms which are incapable of interaction; and notifying by a computing platform a plurality of participants other than said user of said created event, wherein the plurality of participants includes at least one participant from at least each of the at least two virtual world computing platforms which are incapable of interaction, and wherein the notifying is performed using one or more cross-channel notifications.

20. A system for a cross-virtual-world resource scheduling framework comprising:

a computing platform having a processor configured to display a scheduling interface for creating or managing a cross-world virtual world event; and a cross-world event reservationist component of the computing platform configured to cause the processor to:
provide to a user a scheduling interface on a user interface portion of a computing platform, the scheduling interface allowing creation of a cross-world virtual world event, wherein the cross-world virtual event is to be scheduled in a plurality of virtual world computing platforms, the plurality including at least two virtual world computing platforms which are incapable of interaction between the at least two virtual world computing platforms;

create by a computing platform a new cross-world virtual world event to be associated with a virtual identity for said user, wherein the new cross-world virtual world event is scheduled and reserved to occur at a future time in said at least two virtual world computing platforms which are incapable of interaction;

communicate by a computing platform the created event to said plurality of virtual world computing platforms using one or more cross-channel notifications to achieve cross platform scheduling among the at least two virtual world computing platforms which are incapable of interaction; and notify by a computing platform a plurality of participants other than said user of said created event, wherein the plurality of participants includes at least one participant from at least each of the at least two virtual world computing platforms which are incapable of interaction, and wherein the notifying is performed using one or more cross-channel notifications.

* * * * *